United States Patent
Moore et al.

(10) Patent No.: US 8,733,667 B2
(45) Date of Patent: *May 27, 2014

(54) SWITCH FOR MULTI FUNCTION CONTROL OF A THERMOSTAT

(75) Inventors: Glenn A. Moore, Geneva, IL (US); Ernest E. Soderlund, Hampshire, IL (US); Daniel S. Poplawski, Oswego, IL (US)

(73) Assignee: Braeburn Systems LLC, Montgomery, IL (US)

( * ) Notice: Subject to any disclaimer, the term of this patent is extended or adjusted under 35 U.S.C. 154(b) by 519 days.

This patent is subject to a terminal disclaimer.

(21) Appl. No.: 13/069,211

(22) Filed: Mar. 22, 2011

(65) Prior Publication Data

US 2012/0168524 A1 Jul. 5, 2012

Related U.S. Application Data

(63) Continuation of application No. 12/982,959, filed on Dec. 31, 2010, now Pat. No. 8,690,074.

(51) Int. Cl.
 *G05D 23/19* (2006.01)
(52) U.S. Cl.
 USPC .......................................................... 236/94
(58) Field of Classification Search
 USPC ............................ 236/94; 345/184; 700/276
 See application file for complete search history.

(56) References Cited

U.S. PATENT DOCUMENTS

| 4,316,256 | A | 2/1982 | Hendricks et al. |
| 4,730,941 | A | 3/1988 | Levine et al. |
| 4,733,719 | A | 3/1988 | Levine |
| 4,967,382 | A | 10/1990 | Hall |
| 5,038,851 | A | 8/1991 | Mehta |
| 5,230,482 | A | 7/1993 | Ratz et al. |
| 5,482,209 | A | 1/1996 | Cochran et al. |
| 5,765,636 | A | 6/1998 | Meyer et al. |
| 5,782,296 | A | 7/1998 | Mehta |
| 5,937,942 | A | 8/1999 | Bias et al. |
| 6,116,512 | A | 9/2000 | Dushane et al. |
| 6,196,467 | B1 | 3/2001 | Dushane et al. |
| 6,213,404 | B1 | 4/2001 | Dushane et al. |

(Continued)

OTHER PUBLICATIONS

White Rodgers, Installation and Operating Instructions Manual, Model 1F 95-1291, (admitted prior art).

(Continued)

*Primary Examiner* — Cheryl J Tyler
*Assistant Examiner* — Jonathan Bradford
(74) *Attorney, Agent, or Firm* — Arnstein & Lehr LLP

(57) ABSTRACT

The invention provides for a controller such as a thermostat for an HVAC system having a housing having a circuit board and a display screen, the display screen having at least one alpha-numeric icon and a group of touch pads having at least two displayable touch pads. A microprocessor is provided for controlling the display screen. A sole mechanical button or switch is mounted in the housing and the button has a first end and second end and a touch surface extending between the first end and second end. The sole mechanical button signals the microprocessor in order to adjust the alpha-numeric icon (s), so that the combination of inputs received by the microprocessor from the group of touch pads and sole mechanical button provide for each and every adjustment required for all of the operational functions of the controller. The mechanical button may be a rocker switch. The controller may also include a navigation button.

22 Claims, 18 Drawing Sheets

(56) References Cited

U.S. PATENT DOCUMENTS

| | | | |
|---|---|---|---|
| 6,435,418 B1 | 8/2002 | Toth et al. | |
| 6,478,233 B1 | 11/2002 | Shah | |
| 6,502,758 B2 | 1/2003 | Cottrell | |
| 6,549,870 B2 | 4/2003 | Proffitt et al. | |
| 6,595,430 B1 | 7/2003 | Shah | |
| 6,621,507 B1 | 9/2003 | Shah | |
| 6,628,997 B1 | 9/2003 | Fox et al. | |
| 6,783,079 B2 | 8/2004 | Carey et al. | |
| 6,814,299 B1 | 11/2004 | Carey | |
| 6,824,069 B2 | 11/2004 | Rosen | |
| 6,892,547 B2 | 5/2005 | Strand | |
| 7,028,912 B1 | 4/2006 | Rosen | |
| 7,050,026 B1 | 5/2006 | Rosen | |
| 7,114,554 B2 | 10/2006 | Bergman et al. | |
| 7,142,948 B2 | 11/2006 | Metz | |
| 7,146,253 B2 | 12/2006 | Hoog et al. | |
| 7,156,318 B1 | 1/2007 | Rosen | |
| 7,181,317 B2 | 2/2007 | Amundson et al. | |
| 7,225,054 B2 | 5/2007 | Amundson et al. | |
| 7,274,972 B2 | 9/2007 | Amundson et al. | |
| 7,287,709 B2 | 10/2007 | Proffitt et al. | |
| 7,302,642 B2 | 11/2007 | Smith et al. | |
| 7,320,110 B2 | 1/2008 | Shah | |
| 7,360,717 B2 | 4/2008 | Shah | |
| 7,454,269 B1 | 11/2008 | Dushane et al. | |
| 7,489,303 B1 * | 2/2009 | Pryor | 345/173 |
| 7,513,438 B2 | 4/2009 | Mueller | |
| 7,556,207 B2 | 7/2009 | Mueller et al. | |
| 7,584,897 B2 | 9/2009 | Schultz et al. | |
| 7,604,046 B2 | 10/2009 | Bergman et al. | |
| 7,636,604 B2 | 12/2009 | Bergman et al. | |
| 7,693,582 B2 | 4/2010 | Bergman et al. | |
| 7,693,583 B2 | 4/2010 | Wolff et al. | |
| 7,703,694 B2 | 4/2010 | Mueller et al. | |
| 7,706,923 B2 | 4/2010 | Amundson et al. | |
| 7,748,225 B2 | 7/2010 | Butler et al. | |
| 7,775,454 B2 | 8/2010 | Mueller et al. | |
| 7,784,291 B2 | 8/2010 | Butler et al. | |
| 8,244,383 B2 * | 8/2012 | Bergman et al. | 700/17 |
| 8,387,892 B2 * | 3/2013 | Koster et al. | 236/94 |
| 2001/0003451 A1 * | 6/2001 | Armstrong | 345/173 |
| 2007/0228182 A1 * | 10/2007 | Wagner et al. | 236/94 |
| 2007/0278320 A1 | 12/2007 | Lunacek et al. | |
| 2011/0031806 A1 * | 2/2011 | Altonen et al. | 307/32 |

OTHER PUBLICATIONS

Pro1 IAQ, Operating Manual True Comfort IIII, Model T955, 2010.
Honeywell, Operating Manual, VisionPro TH8000, 2009.

* cited by examiner

SWITCH FOR MULTI FUNCTION CONTROL OF A THERMOSTAT

CROSS REFERENCE TO RELATED APPLICATION

The present invention is a continuation of co-pending U.S. patent application Ser. No. 12/982,959 filed on Dec. 31, 2010, to which this application claims priority.

The present invention pertains to a switch for a multi-function control and in particular a rocker switch used for a thermostat in order to control multiple functions of a HVAC system and controlled by the thermostat.

BACKGROUND

Thermostats typically have multiple functions that require user input, such as setting time of day, day of week, programming temperature set points or programming user settings.

Control panels typically include an assortment of buttons for operating the thermostat and adjusting the settings. Adjustment of the settings using the assortment of buttons can often times be confusing to the user and require detailed review of user manuals and instruction guides in order to properly operate the thermostat and adjust the settings to the user's liking.

In some cases a liquid crystal display (LCD) may be provided that includes touch pads populated on the display screen. The touch pad may include numerals, word phrases or graphics (collectively, "icons") that appear on the display screen. By touching the appropriate icon, the user can make adjustments to the functioning of the thermostat and activate specific modes of operation or make setting adjustments. Some display screens include so many icons that is difficult for the user to find the appropriate icon. Also when multiple icons are displayed on a screen so that the maximum number of functions may be identified via the icons on the single screen, the size of each individual icon may tend be small. Due to the small size of the icon buttons displayed on the screen and the over-population of the display screen with multiple icon buttons, it can be very difficult for a user to operate such a thermostat.

Some thermostats are known to have mechanical buttons or switches ("hard buttons"). Such hard buttons are commonly used in combination with touch pads ("soft buttons") on a LCD. For example, thermostats are known that have an "UP" button pad and a "DOWN" button pad disposed within two apertures formed in the face of a housing, and being the only hard buttons provided by the thermostat. Such buttons have a flexible arm interconnecting each of the buttons. The arm is mounted behind the housing and cannot be touched or viewed by a user when the thermostat housing is assembled. The flexible arm provides for movement of the two button pads. Some thermostats have multiple hard buttons on different portions of the thermostat housing. The use of the hard buttons can be confusing to a user when there are multiple buttons populating the thermostat housing. Further, when the thermostat includes multiple hard buttons and multiple touch pads on a display screen the interaction and combination of usage of such hard buttons and soft buttons can be confusing to a user. In such cases the proper combination of when to use the hard button in combination with the soft button and the proper coordination and sequencing of the use of the hard and soft buttons can raise the level of complexity for a user beyond that which is comprehendible and such complexity may prevent the proper programming or operation of the thermostat.

The present invention overcomes many of the above mentioned disadvantages of previously known thermostats.

SUMMARY

A thermostat is provided that includes a microprocessor for controlling a HVAC system using multiple modes of operation comprising a housing for enclosing a circuit board and encasing a display screen. A rocker switch is mounted in the housing adjacent to the display screen. The rocker switch may include a bar having a first end and a second end, so that the bar may rock between a first position where the first end is depressed and second position where the second end is depressed. The thermostat further comprises a first receptor mounted on the circuit board adjacent the first end and a second receptor mounted on the circuit board adjacent the second end. The first and second receptors may signal the microprocessor in order to adjust a first and second alpha-numeric icon represented on the display screen during at least a first and second mode of operation of the thermostat. During the first mode of operation moving the rocker switch to the first or second position will cause an adjustment of the first icon in relation to the first mode of operation. During the second mode of operation, moving the rocker switch to the first or second position will cause an adjustment of the first or second icon in relation to the second mode of operation.

In an embodiment, the first mode of operation comprises one of adjusting the temperature setting, time of day setting, day of week setting, programming set point time, installer setting configuration or user setting. In an embodiment, the second mode of operation comprises one of adjusting the temperature setting, time of day setting, day of week setting, programming set point time, installer setting configuration or user setting. In an embodiment, the first mode is different from the second mode. In an embodiment, the second mode of operation set point is adjusted by the first actuator contacting the first receptor.

In an embodiment, the display screen may include an icon representing one of a programming, configuration, system, fan, hold, day, time, clean, humidity, outdoor, installer or user modes. In an embodiment, the rocker switch may select one of a residential, commercial, programming, system type, set point lower limit, set point upper limit, compressor balance point, auxiliary heat balance point or service filter monitor modes. In an embodiment, the rocker switch may adjust one of a time, day, temperature, fan or humidity value.

In an embodiment, the first receptor may be a shorting finger on the circuit board. In an embodiment, the first position may increment the set point of the first mode of operation. In an embodiment, the second position may decrement the set point of the first mode of operation.

In an embodiment, the housing may include a pocket and the rocker switch is mounted within the pocket so that the bar may be rocked therein. In an embodiment, the pocket may include a first aperture and the first actuator extends from the bar through the first aperture to the first receptor, the second actuator may extend from the bar through the first aperture to the second aperture and the pivot member may extend from the bar through the first aperture to the circuit board.

In an embodiment, the display screen may include a first icon and upon depressing the first or second end of the bar, the first icon on the display is adjusted in order to reflect adjustment of a set point. In an embodiment, the first icon may be a numeric and the adjustment by depressing the bar either decrements or increments the numeric. In an embodiment, the first icon is a graphical display.

In an embodiment, the display screen may include a touch pad for selecting the first mode of operation and the second mode of operation and the rocker switch may adjust set points for the modes selected by the touch pad. In an embodiment, the display screen may include a first touch pad for selecting the first mode of operation wherein the bar is depressed to adjust a set point to a first value for the first mode of operation and a first icon on the display is adjusted to reflect the first value. A second touch pad may be provided by the display screen and at least one of the first touch pad or the second touch pad is activated to select the second mode of operation wherein the bar is depressed to adjust a set point to a second value for the second mode of operation and a second icon on the display is adjusted to reflect the second value. In an embodiment, the first and second icons are displayed simultaneously on the display. In an embodiment, the first value is interdependent on the second value. In an embodiment, continuously depressing on the bar will cause the first or second value to sequentially decrement or increment until the bar is released.

In an embodiment, multiple icons may displayed on the display screen simultaneously and upon activation of the touch pad the first icon is modified to indicate that it is the icon being adjusted while the other icons remain unchanged. In an embodiment, following a flashing display of the first icon and depression of the bar, the flashing is deactivated and the first icon is adjusted to reflect the first value. In an embodiment, the first and second touch pads may be activated simultaneously in order to select the first mode of operation. In an embodiment, the first touch pad may allow for selection of both the first and second mode of operation. In an embodiment, the display screen may be an LCD segmented screen.

While the foregoing provides a general explanation of the subject invention, a better understanding of the objects, advantages, features, properties and relationships of the subject invention will be obtained from the following detailed description and accompanying drawings which set forth an illustrative embodiment which is indicative of the various ways in which the principle of the subject invention may be employed.

BRIEF DESCRIPTION OF THE DRAWINGS

For a better understanding of the subject invention, reference may be had to embodiments shown in the attached drawings in which.

DETAILED DESCRIPTION

Figure 1:
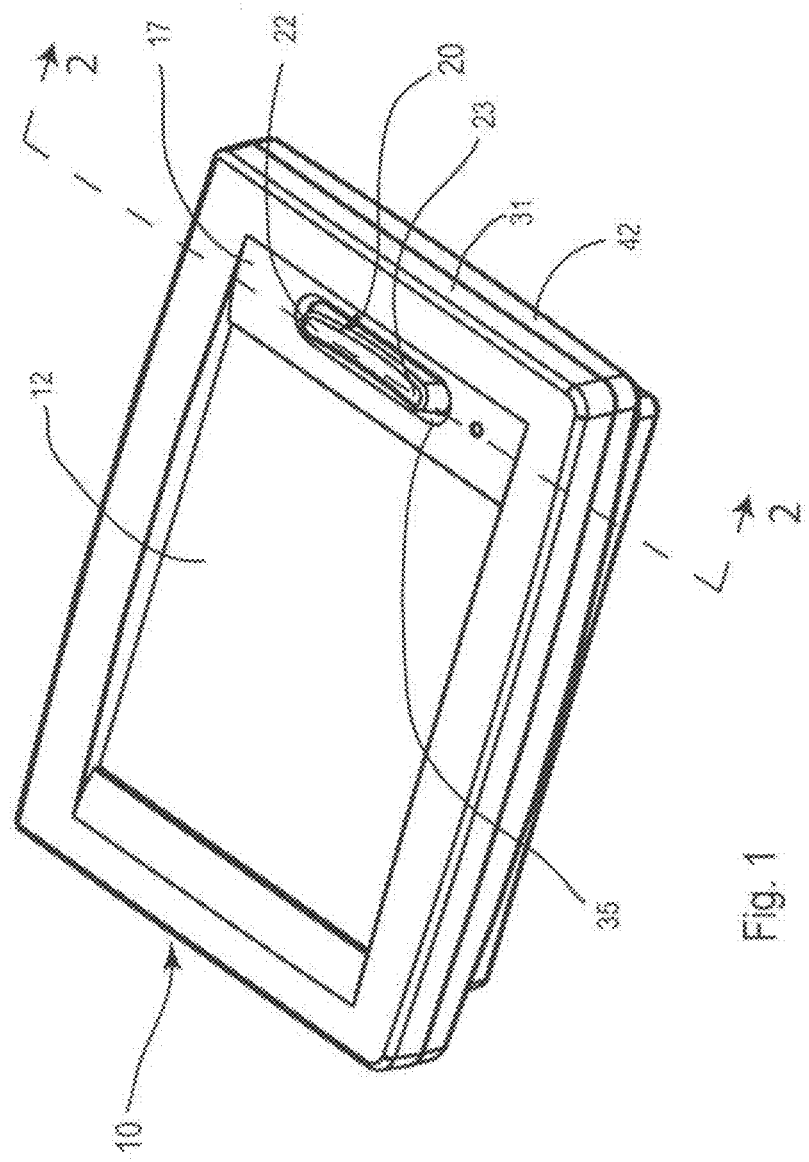
FIG. 1 illustrates a perspective view of an embodiment of a thermostat of the present invention.

An embodiment of the present invention is depicted with respect to the following FIGS. 1-18, and in particular the physical construction of the invention is described with respect to FIGS. 1-5 as follows. A thermostat 10 or controller includes a display screen 12 and a printed circuit board 15 mounted within a housing. A rocker switch (mechanical button) 20 is formed of a longitudinal bar 21 having a first end 22 and a second end 23. The thermostat 10 includes a front face 17. The rocker switch 20 is mounted so that the switch button is exposed in the front lace 17 and may be easily operated by a user. As shown in FIG. 1, the thermostat 10 is oriented so that the first end 22 of the rocker switch 20 is oriented at the upper portion of the thermostat 10 and the second end 23 of the rocker switch 20 is located toward the lower portion of the thermostat. In this orientation, the rocker switch 20 may provide for the first end 22 to act as the "up" incrementation or adjustment of a set point and the second end 23 indicates "down" decrementation or adjustment of a set point. As will be discussed in more detail below, the rocker switch 20 may also adjust modes of the thermostat 10 by rocking the switch to the "up" position by depressing the first end 22 or "down" position by depressing the second end 23.

Figure 2:
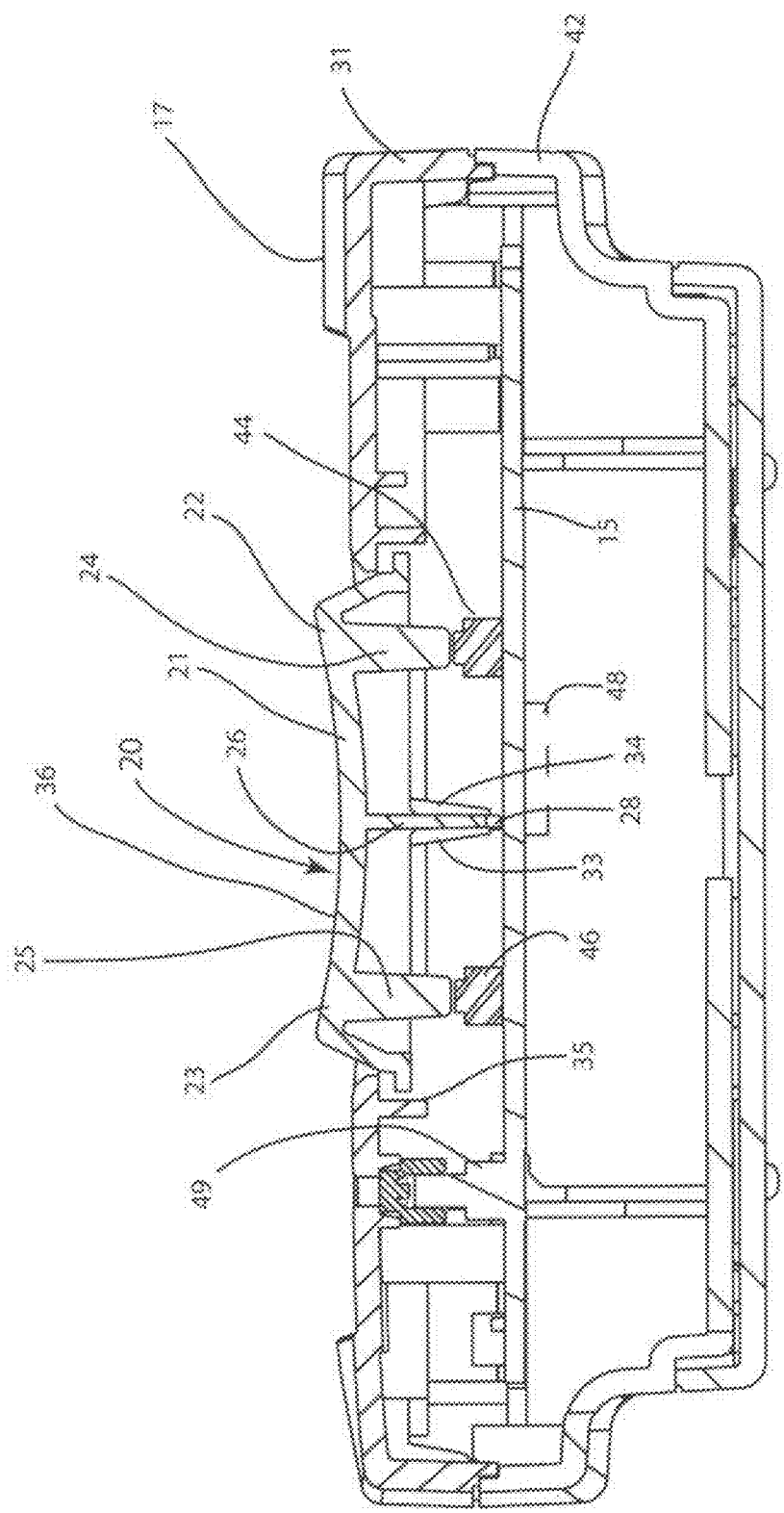
FIG. 2 is a side elevation section view taken at line 2-2 from FIG. 1.
Figure 3:
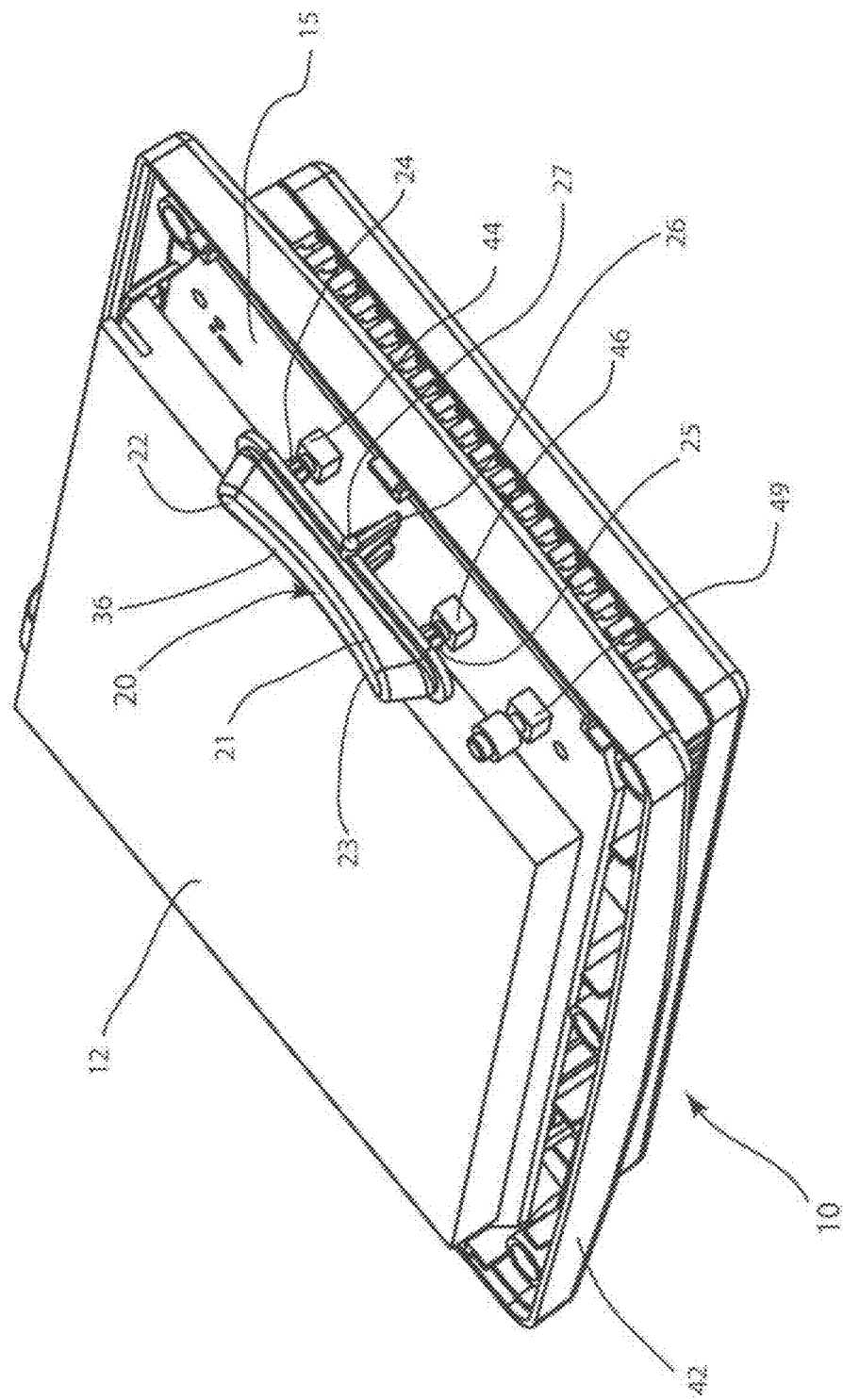
FIG. 3 is a perspective view of the thermostat of FIG. 1 with the upper housing removed.
Figure 4:
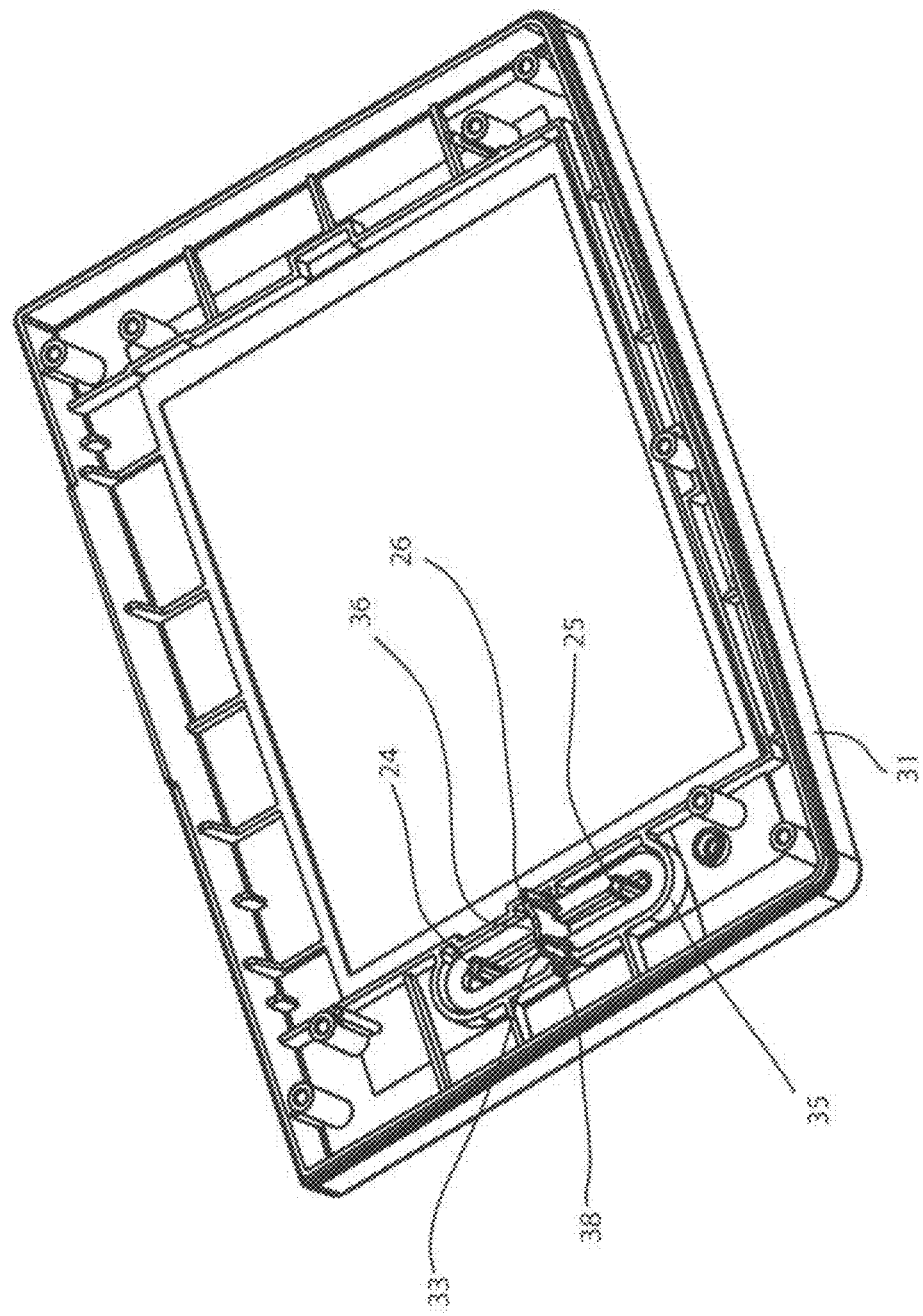
FIG. 4 is a perspective view of the bottom of the upper housing of the thermostat of FIG. 1.

Turning to FIGS. 2 and 3, a more detailed description of the rocker switch and its assembly to the thermostat 10 will be discussed. The rocker switch 20 includes a first actuator 24 and second actuator 25 disposed at each end of the bar 21. A pivot member 26 extends downward from the bar 20. The pivot member 26 is disposed at a mid-point between the first and second actuators 24, 25. The pivot member 26 terminates at a pivot point 28 which abuts against the printed circuit board 15. A retention boss 27 is provided at the top of the pivot member 26 and will be discussed in more detail below.

An upper housing 31 is provided which encloses the display screen 12 and provides a covering over the printed circuit board 15 and other components thereon. The upper housing 31 provides an aperture pocket 35 within which the rocker switch 20 is mounted. The bar 21 includes a touch surface 36 extending between the first and second end 22, 23 of the rocker switch 20, so that a user may slide her finger, without interruption, along the touch surface 36 to rock the switch 20 between a first position with the first end 22 depressed and a second position with second end 23 depressed. Having the touch surface 36 completely exposed at the front lace 17 within the aperture 35 allows for fast and easy operation of the rocker switch 20. In an embodiment, the pocket 35 is formed of a pocket wall having an oval shape and a single aperture opening toward the printed circuit board 15. The bottom of the rocker switch 20 include the first and second actuators 24, 25 and pivot member 26 that each extend through the pocket wall aperture 35.

The circuit board 15 is mounted in an upper housing 31 (FIG. 2). Mounted on the printed circuit board 15 are a first receptor 44 and a second receptor 46. Other components mounted to the printed circuit board 15 include a microprocessor 48, relays, connectors, switches and thermistor(s). A receptor 49 is also mounted on the printed circuit board 15. The receptors 44, 46, 49 may include components such as switches. In alternate embodiment, a shorting finger may be provided on the printed circuit board 15 to be activated by the rocker switch 20. As shown in FIGS. 2 and 3 it may be understood that depressing on the first end 22 of the rocker switch 20 causes the bar 21 to rotate, so that the first actuator 24 moves in a downward direction towards the first receptor 44 and the terminal portion of the first actuator 24 activates the receptor 44 and closes the switch. As will be discussed further below, in some cases this actuation this will cause a set point of a thermostat mode of operation to increment. Alternatively, when the rocker switch 20 is rocked the other way, by depressing the second end 23 downward, the second actuator 25 will be moved downward toward the second receptor 46 and the terminal portion of the second actuator 25 will depress the trigger of the second receptor 46 and close the switch. As will be discussed in further detail below in certain embodiments, such actuation will cause a decrement of a set point of the mode operation.

Figure 5:
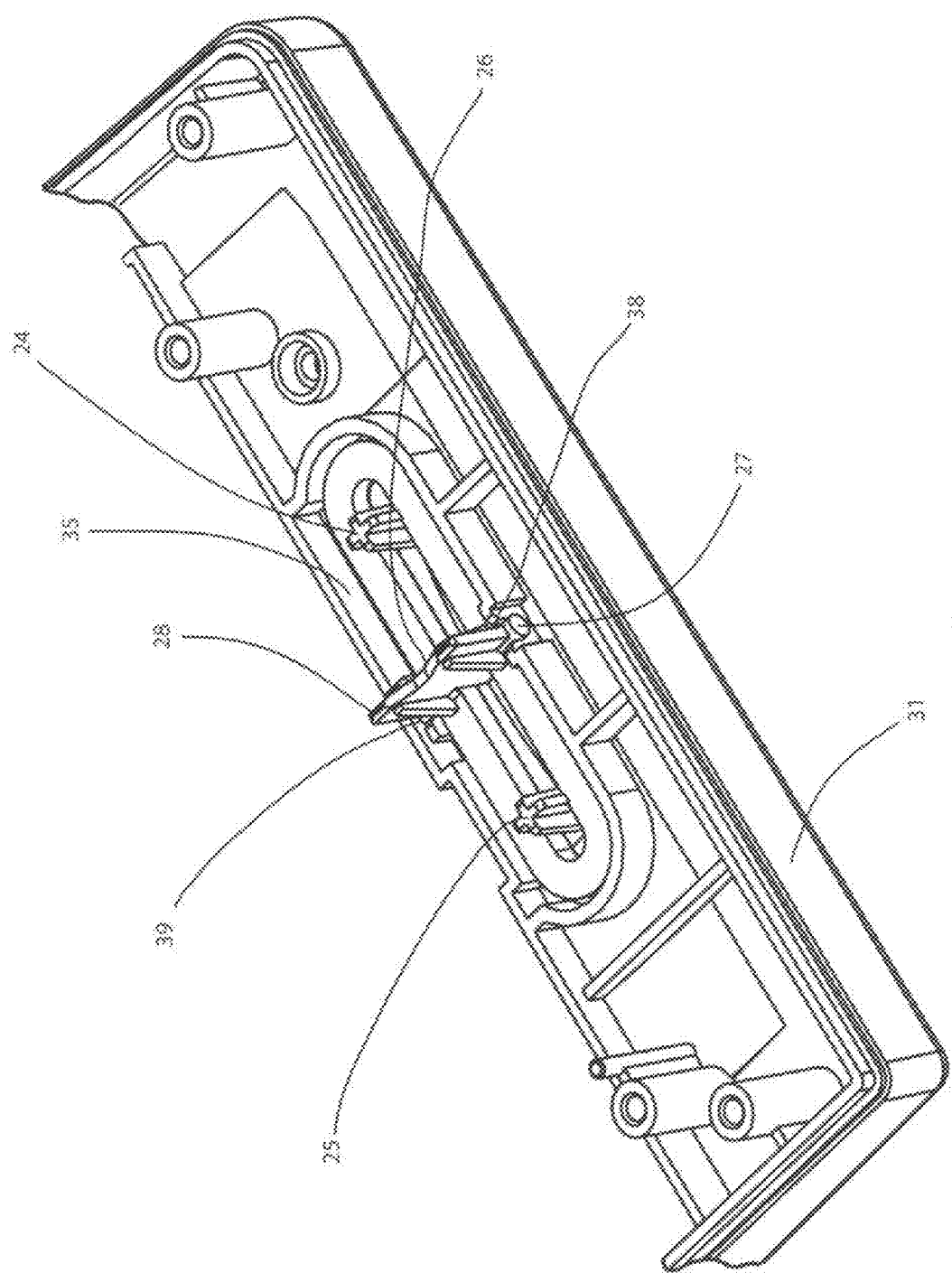
FIG. 5 is an enlarged perspective view of the upper housing depicted in FIG. 4.

The rocking of the rocker switch 20 can be understood in more detail in respect to FIG. 5. The retention member 26 includes a retention boss 27 extending there from. The boss 27 is received in a retention slot 38, 39 on both sides of the pivot member 26. In an embodiment, the retention slot 38, 39 has a much larger diameter than the diameter of the boss 27, so that there is a loose fit when the boss 27 is mounted within the slot 38, 39. In an embodiment, since the first and second actuators 24, 25 are already resting on the receptors 44, 46, respectively only a slight rocking of the rocker switch 20 is necessary in order to close the switch of the first or second receptors 44, 46. For example, in an embodiment, a movement of the first actuator 24 of 0.010 inches will actuate the first receptor 44. The rocking motion of the rocker switch 20 to allow for the movement of the first actuator by 0.010 inches can be accommodated by the looseness of the slot 38, 39 maintaining the boss 27. When the rocker switch 20 is rocked by the depressing of the first or second end 22, 23, the pivot member 26 pivots upon the pivot point 28 and the boss 27 moves in the slot 38. The pivot member 26 includes stiffener ribs 33, 34.

The slot 38 also functions to hold the rocker switch 20 against the upper housing 31 in order to maintain the button 20 in position when the upper housing 31 is assembled to the lower housing 42. In an embodiment, the rocker switch 20 is mounted in the pocket 35, so that the boss 27 is received in the slot 38 of the pocket wall 35. The upper housing 31, including the rocker switch 20, is then mounted onto the lower housing 42. The upper housing 31 may be attached to the lower housing 42 in any manner such as the snap-fit of tabs or via fasteners, such as screws. Prior to assembly of the upper housing 31, the printed circuit board and its components and the display screen 12 are mounted within the lower housing 42. In this manner, the boss 38 can retain the rocker switch 20 in place within the pocket 35 and allow for the pivoting rocking motion necessary for the actuation of the first and second receptors 44, 46. In an embodiment, the display screen 12 may be a liquid crystal display (LCD) having a segmented format. Alternate embodiments may include dot matrix LCD displays or LED display screens.

The rocking of the rocker switch 20, either by depressing the first end 22 or the second end 23 will cause the receptors 44, 46 to open and close in order to operate the thermostat 10. The rocker switch 20 may be operated by, for example, by single finger strokes where each depression of the first end 22 will cause for example, a single increment to a set point value (e.g. increase in a temperature setting). Likewise, each single finger stroke or depression at the second end 23 will cause a single decrement of a set point. As well, the rocker switch 20 may be programmed to allow for sequential increments or decrements when this hard button 20 is held down for more than one second. For example, if a user's finger depresses die first end 22 downward for more than one second, in an embodiment, it will increment at a rate of four times per second while the first actuator 24 maintains its depression of the first receptor 44. Likewise, if a user's finger depresses the second end 23 of the rocker switch 20 for more than one second it will depress the receptor 46 continuously and will cause a decrement at the rate of four times per second (e.g. decrease a temperature setting in a sequential, automated manner).

As depicted in the FIG. 1-3, the bar 21 of the rocker switch 20 has a concavity which provides for the first end 22 and second end 23 to be elevated above the face 17 of the upper housing 31. Having such a shape of the bar 21 that forms the rocker switch 20, the user can easily locate his or her finger at the upper or lower end 22, 23 of the bar 21. However, it may be understood that any shaped bar 21 or rocker switch 20 may be provided by the present invention, such as a straight, flat bar, circular shaped button, square shaped or other shaped buttons which are known to those of skill in the art. The importance of the present invention is that a hard button is provided that allows for a user to speedily make adjustments of functions and values displayed on the display screen 12.

Figure 6:
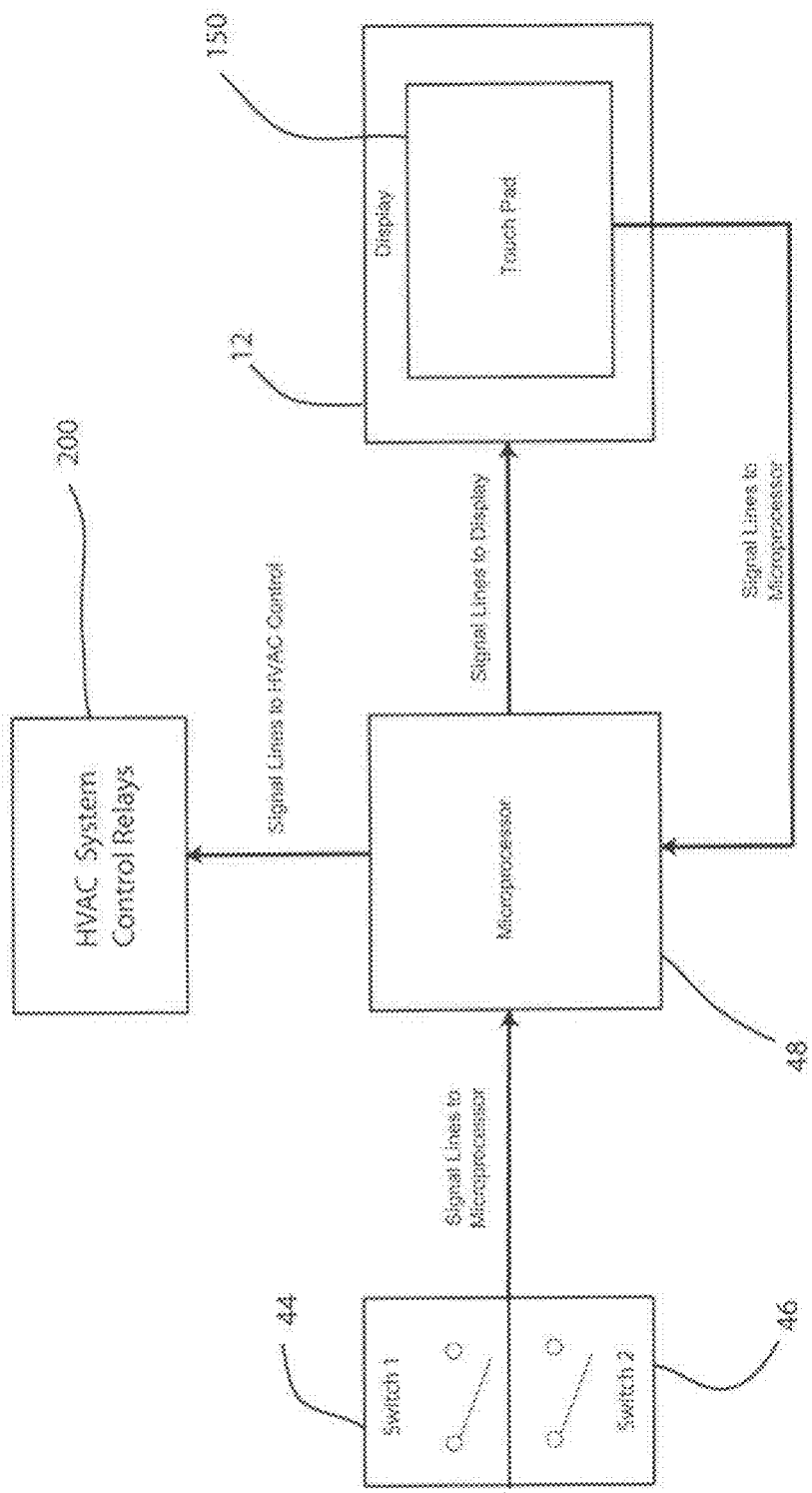
FIG. 6 is a schematic diagram of the present invention.

Turning to FIG. 6, an overview of the electronic circuitry and components of the thermostat 10 of the present invention will be described. Switch 1 is provided, such as the first receptor 44, which may be opened and closed in order to signal the microprocessor 48. As well a Switch 2, such as the second receptor 46, is provided which may be opened or closed to signal the microprocessor 48. The microprocessor controls the HVAC system 200 attached to the thermostat 10 and also is connected to the display 12, which allows for user input to adjust the system. For example, in a typical HVAC system 200, the thermostat 10 would be used to adjust the healing or cooling of the system in order to provide a comfortable environment for the occupants. The microprocessor 48 includes ROM which may have software loaded into it, in order to control the thermostat 10 and to provide for the display screen functionality. The display screen 12 includes displayable touch pads. As will be discussed in greater detail below, the combination of the actuation of Switch 1 and Switch 2 (via the rocker switch 20) and the touch pads on the display screen 12 allow the microprocessor 48 to monitor and control the air handler HVAC system 200 or any other system to which the thermostat 10 is connected.

Figure 7:
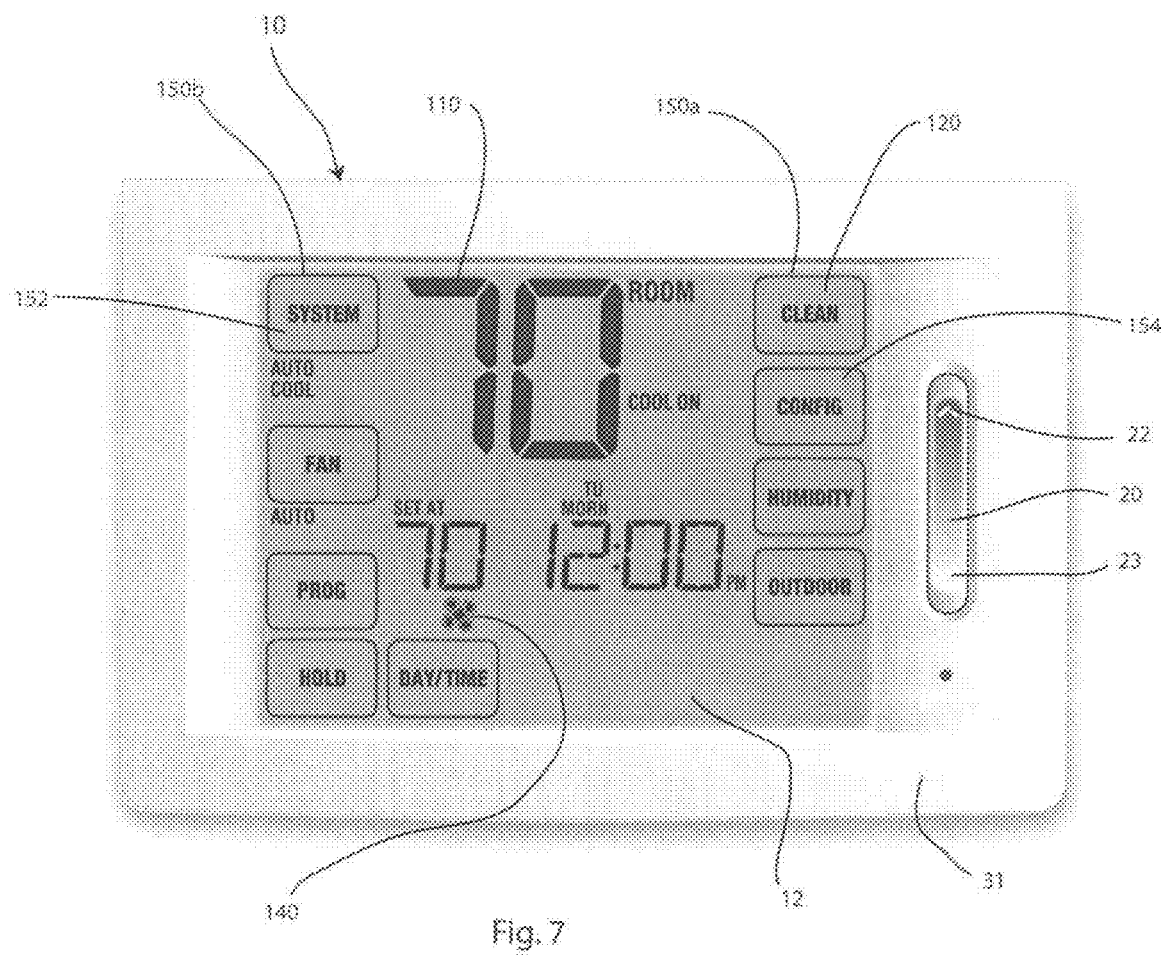
FIGS. 7-18 are diagrammatic views of the display screen of embodiments of the present invention illustrating examples of operation of the present invention.

Turning to FIG. 7-18, the operation of the thermostat will be described in further detail. FIG. 7 depicts the thermostat 10 including the display screen 12 having multiple icons displayed thereon. The display includes numeric icons 110, alpha-numeric icons 120 and graphical icon 140. Also included on the display, are touch pad icons 150a, 150b. In the embodiment displayed in FIG. 7, the numeric icon "70" 110 is an indication of the current room temperature and is indicated as such by the "ROOM" icon. As well, an alpha-numeric icon 120 is indicating that the HVAC cooling system is running as indicated by the "COOL ON" icon. Other numeric icons 110 are displayed including "70" which is displayed below the alpha-numeric icon "SET AT": so "70" is the set point at which the thermostat is set to trigger the HVAC system. Numeric icon "12:00" indicates a set point at which the temperature should be at 70 degrees. According to the alpha-numeric icon "TU MORN" indicating that on Tuesday mornings at 12:00 p.m. the set point should be 70 degrees Fahrenheit.

The graphical icon 140 in this embodiment is a representative pictorial of a fan blade and indicates that the fan mode is on and running. Other types of graphical icons may be provided on the display 12.

Other alpha-numeric icons 120 are included within touch pad areas 150a, 150b. For example, as depicted on the display 12 in the embodiment of FIG. 7, the touch pad areas 150a, 150b that are provided and designated with alpha-numeric icons 120 are "CLEAN" "CONFIG" "HUMIDITY" "OUTDOOR" "SYSTEM" "FAN" "PROG" (PROGRAM) "HOLD" "DAY/TIME". In the embodiment depicted in FIG. 7, the touch pad areas 150a, 150b are designated by rectangular outlines provided the display screen 12. In an alternate embodiment, the display screen 12 may have no touch pads and may function solely to display alpha-numeric 120, graphical 140 and numeric icons 110. In such alternate embodiment the housing may include the rocker switch 20 and other mechanical buttons to operate the thermostat. For example, a first mechanical button for the menu function and a second mechanical button for the program function may be provided adjacent the rocker switch 20.

Coincident with the touch pad areas 150*a*, 150*b* displayed on the display screen 12 are sensing areas provided by a sensing membrane above the display screen 12. For example, in the display for the touch pad areas on the right side of the display screen 12 (including "CLEAN" "CONFIG" "HUMIDITY" "OUTDOOR" forming a row of four icon touch pad areas 150*a*, 150*b*), a single long touch activation area on the touch membrane above the screen layer 12 will be provided. Likewise, on the left side of the display screen 12, an "L" shape touch sensitive area on the membrane below the touch screen layer 12 will be provided over the touch pad areas 150*a*, 150*b* on the display screen 12 (coinciding with the "SYSTEM" "FAN" "PROG" "HOLD" AND "DAY/TIME" icons). Thus in the embodiment described above, it may be understood that there is no touch sensing capabilities in the center of the display screen 12, where the numeric icons 110 for the current room temperature set point, or time set point are displayed. In the embodiment, depicted in FIG. 7 the alpha-numeric icons 120 provided in each of the touch pad areas 150*a*, 150*b* are modes of operation for the thermostat 10. Generally speaking, the modes of operation may be activated by touching the display screen 12 associated with the particular mode, as identified by the alpha-numeric icons 120. For example, the action of the user's finger applied to the display screen 12 at the area identified by the alpha-numeric icon "CLEAN" 120 bounded by the rectangle indicating the touch pad area 150*a* will activate the "CLEAN" mode and allow for setting of the filter cleaning mode or reminder.

In an embodiment, the touch sense regions of the touch sensitive membrane below the touch pad 150*b* for "SYSTEM" and "FAN" will not be touch reactive. For example, when the "SYSTEM" touch pad 150*b* is pressed, the "AUTO" alpha-numeric icon will be highlighted or made bold to indicate that the automatic feature of the system has been activated. Likewise, when the "SYSTEM" touch region 150*b* is pressed a second time by a user's finger, the alpha-numeric icon 120 "COOL" will be displayed as being activated. Such activation may be indicated by making the "COOL" alpha-numeric icons 120 bold. However, in this embodiment, neither the "AUTO" or "COOL" area of the display screen 12 is touch sensitive. Similarly, the area where the "AUTO" alpha-numeric icon 120 is displayed below the "FAN" touch pad area 150*b* is not touch sensitive.

The initial setting of the thermostat 10 involves configuration of installer settings in the embodiment disclosed in FIG. 7. The installer settings are selected by pressing the "SYSTEM" button 152 and "CONFIG" button simultaneously. By holding down the buttons, 152, 154 simultaneously for three seconds the installer settings mode will be activated. It is noted that the term "BUTTON" refers to the combination of the alpha-numeric icon (for example, "SYSTEM") and the touch pad area 150 designated by the rectangular outline of the pad. "Soft" button refers to those buttons located on the touch screen display 12 and "HARD" button refers to a button separate from the touch screen display (i.e. the rocker switch 20).

Figure 8:
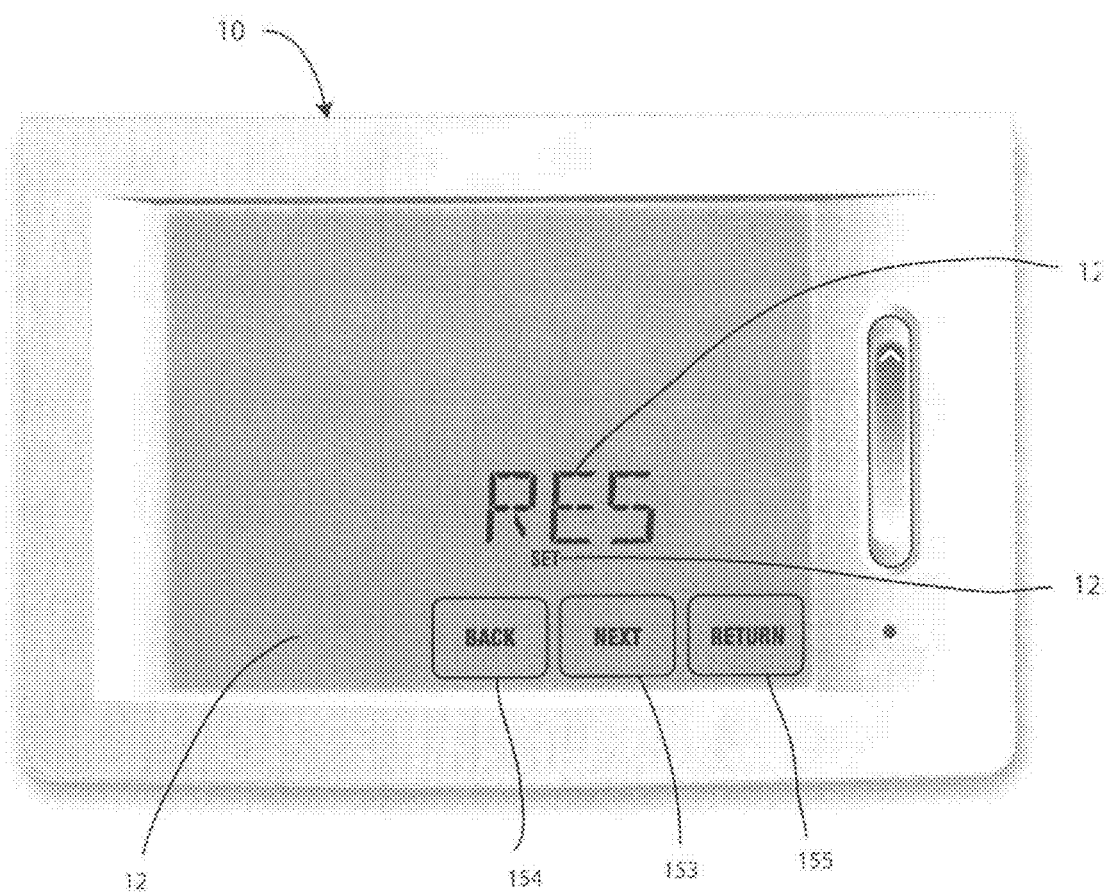

Once the installer setting mode has been selected by holding down buttons 152, 154, the display screen 12 will advance to the installer setting mode, as depicted in FIG. 8. The display on the display screen 12 is adjusted so that an alpha-numeric icon 121 is displayed, which represents a residential mode ("RES") and includes the alpha-numeric icon 122 "SET". The display of the alpha-numeric icons 121, 122 indicate that the user can set a residential mode. The alternate mode to be selected would be a commercial mode. The rocker switch 20 is used in order to select the residential or commercial mode by scrolling through the available options. In an embodiment, the thermostat 10 may provide for factory default settings. For example, in an embodiment, the residential ("RES") installer setting mode may be the default factory setting. In a case where the installer desires for the residential mode to be selected as an installer setting when the "RES" alpha-numeric icon is displayed on the screen, the user can select the "NEXT" button 153 in order to advance to the subsequent mode to be selected. The display screen in the residential/commercial mode also displays a "BACK" alpha-numeric icon and button 154 and a "RETURN" alpha-numeric button 155. If the user is finished with the display screen, she may then choose the "BACK" button 154 in order to go back to the previous screen or she may select the "RETURN" button 155 in order to return to the previous selected mode display. In the case, where the user has selected the "NEXT" button 153, the thermostat will display on the display screen 12 the display of FIG. 9.

Figure 9:
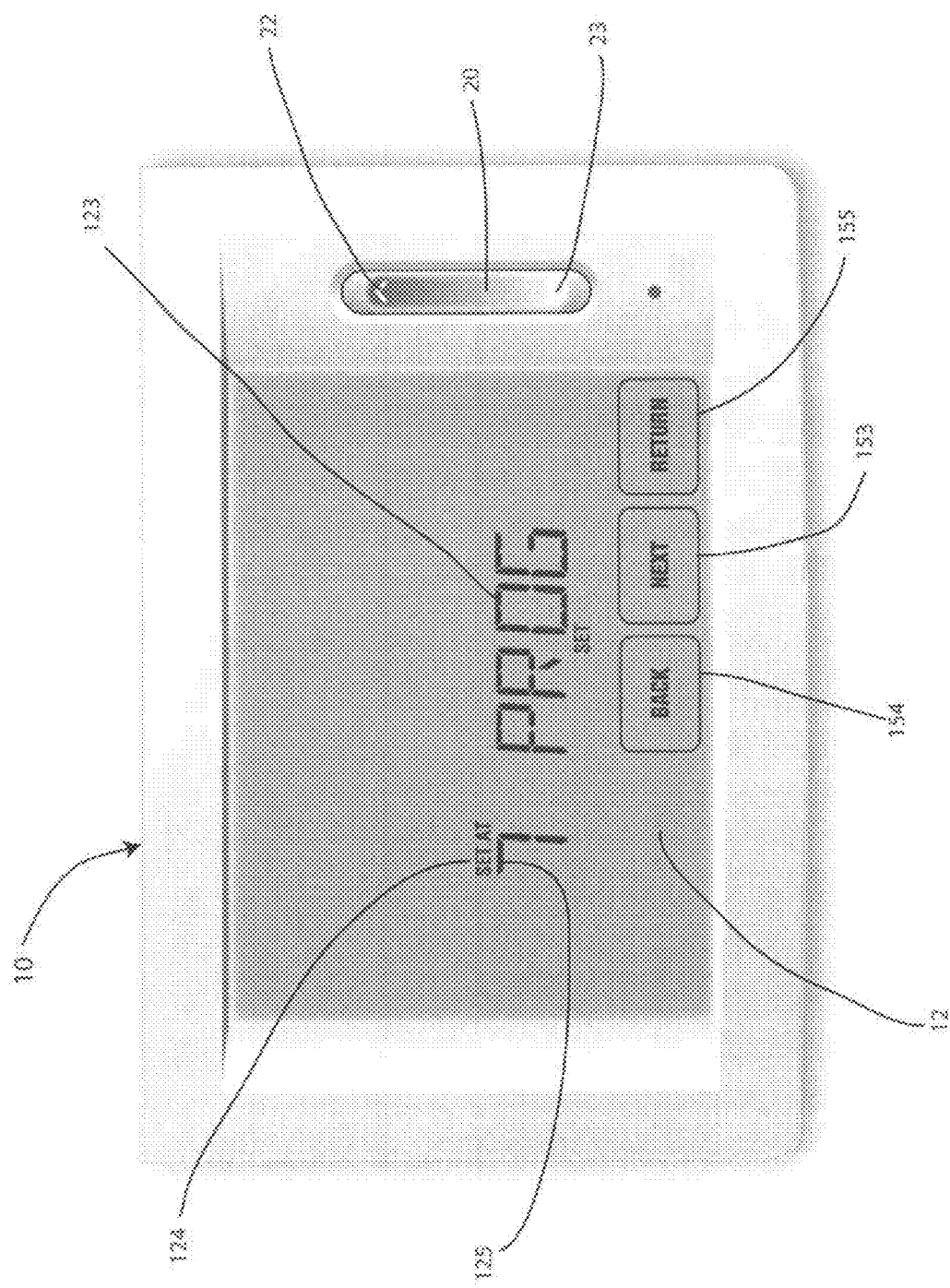

The display of FIG. 9 depicts the programming mode for the installer settings and the alpha-numeric icon "PROG" 123 is displayed to indicate the programming mode may be "SET", as indicated by the alpha-numeric icon "SET" 122. Multiple options to be programmed are available and are designated with respect to the alpha-numeric icon "7" 125. The icon "SET AT" 124 indicates that the programming mode may be set at option number "7". In this embodiment, the factory default setting is "7". When the display screen is initially displayed, after advancing from the previous mode (i.e. the residential or commercial selection mode) the "7" 125 icon is automatically displayed on the display screen 12. The user may select other available options by depressing the first end or second end 22, 23 of the rocker switch 20. The icon 125 will be adjusted based on the selection made by the rocker switch 20.

Based on the sequence of events as discussed with respect to FIGS. 7-9, it may be understood that during the first mode of operation with respect to determining a residential or commercial mode as identified by alpha-numeric icon 121, the rocker switch 20 is actuated by pressing on the first end or second end 22, 23 in order to make a selection with respect to a first residential or commercial mode. Thereafter following depression of the "NEXT" button 153, a second mode of operation ("i.e. the programming mode) as designated by alpha-numeric icon 123 is displayed and adjusted via the actuation of the first end or second end 22, 23 of the rocker switch 20 in order to adjust the programming option with respect to alpha-numeric icon 125 displayed on the display screen 12. This interaction between the touch pads 150*a*, 150*b* and the rocker switch 20 allows for easy progression through the functionality provided by the thermostat 10 and allows for rapid selection of modes and settings by using the "UP" and "DOWN" actuation of the first end and second end 22, 23 of the rocker switch 20.

Figure 10:
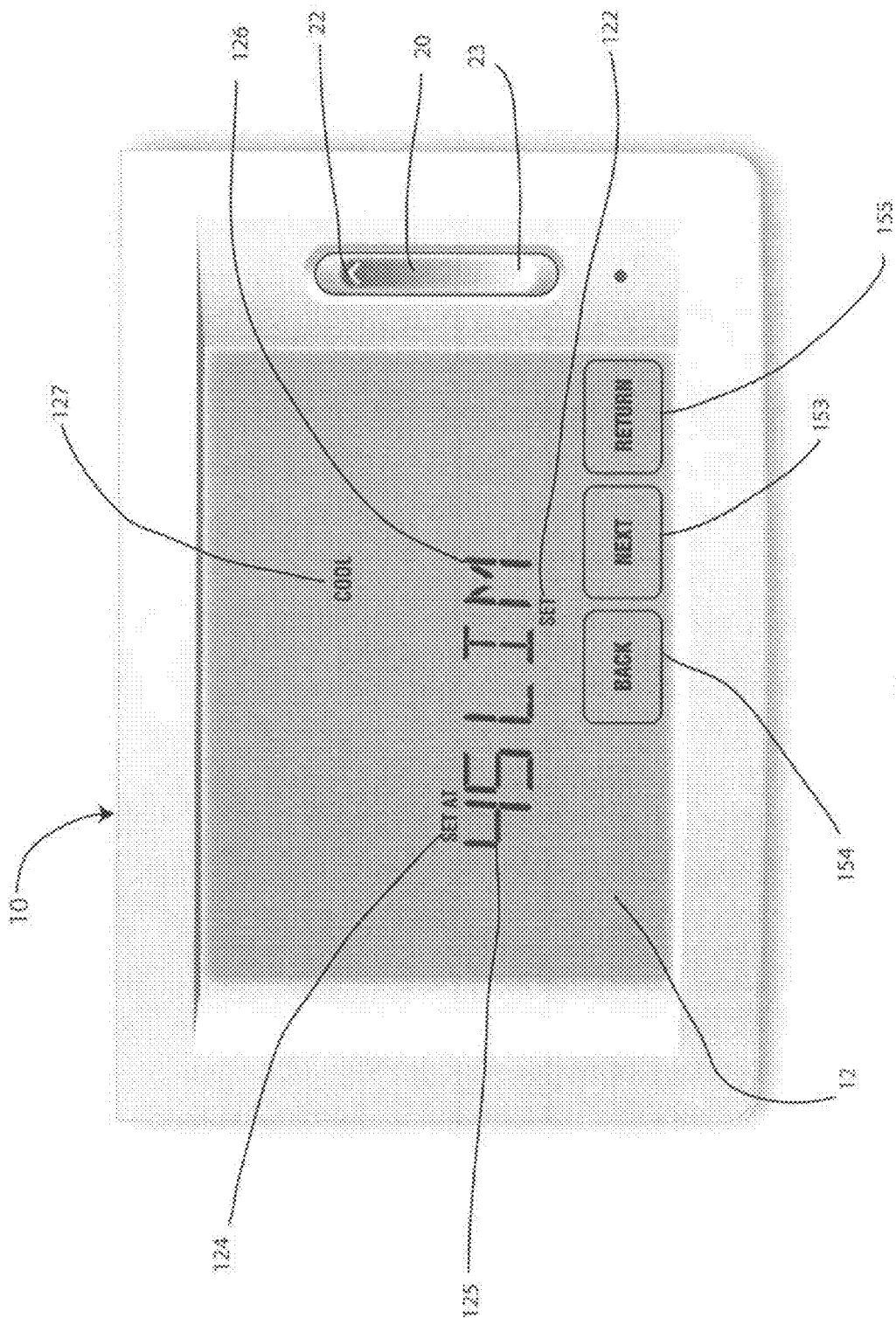

With respect to FIG. 9, once the user has completed the selections with respect to the programming mode, the activation of the "NEXT" button 153 will provide a new display as shown in FIG. 10 that allows for a cooling set point lower limit to be set. This additional installer setting screen depicted on FIG. 10 is alpha-numeric icon 126 indicating the limit ("LIM") for the set point. The icon 124, 126 indicates the lower limit of the cooling functionality of the thermostat 10. Alpha-numeric icon "SET AT" 124 indicates that the limit may be set at the value displayed with respect to numeric icon 125 (i.e. "45"). The display indicates that this is a cooling limit with respect to alpha-numeric icon 127 "COOL". The numeric icon 125 allows for the setting of a temperature. In an embodiment, the temperature range provided may be 45° F.-90° F. This will be the installer setting lower limit for cooling for operation of the thermostat 10.

The set point value for the lower limit is adjusted by actuation of the rocker switch 20. By depressing the first end 22 of the rocker switch 20, the numeric icon 125 is incremented upwards towards an upper limit such as 90°. The user may depress the first end 22 serially, degree by degree, in order to move to the desired temperature setting or may depress the first end and hold down the bar in order so that the numeric icon 125 will automatically scroll and increment upward through the temperature range, for example from 45° F.-90° F. In an embodiment, the factory default will be 45° F. and when the initial display appears as shown in FIG. 10, the numeric icon 125 will be "45". Thus, any change made initially by a user will be to increment by depressing the first end 22 of the rocker switch 20. However, should the user go past the temperature setting desired, she may then decrement the numeric icon 125 by pressing the second end 23 of the rocker switch 20 in order to lower the desired temperature setting. Thus, it is understood that the cooling lower limit mode was selected by actuation of the "NEXT" touch pad 153 in FIG. 9 and, upon display of the lower limit icon 126 as depicted in FIG. 10, the set point was adjusted by actuation of the rocker switch 20 by depressing the first or second ends 22, 23.

Figure 11:
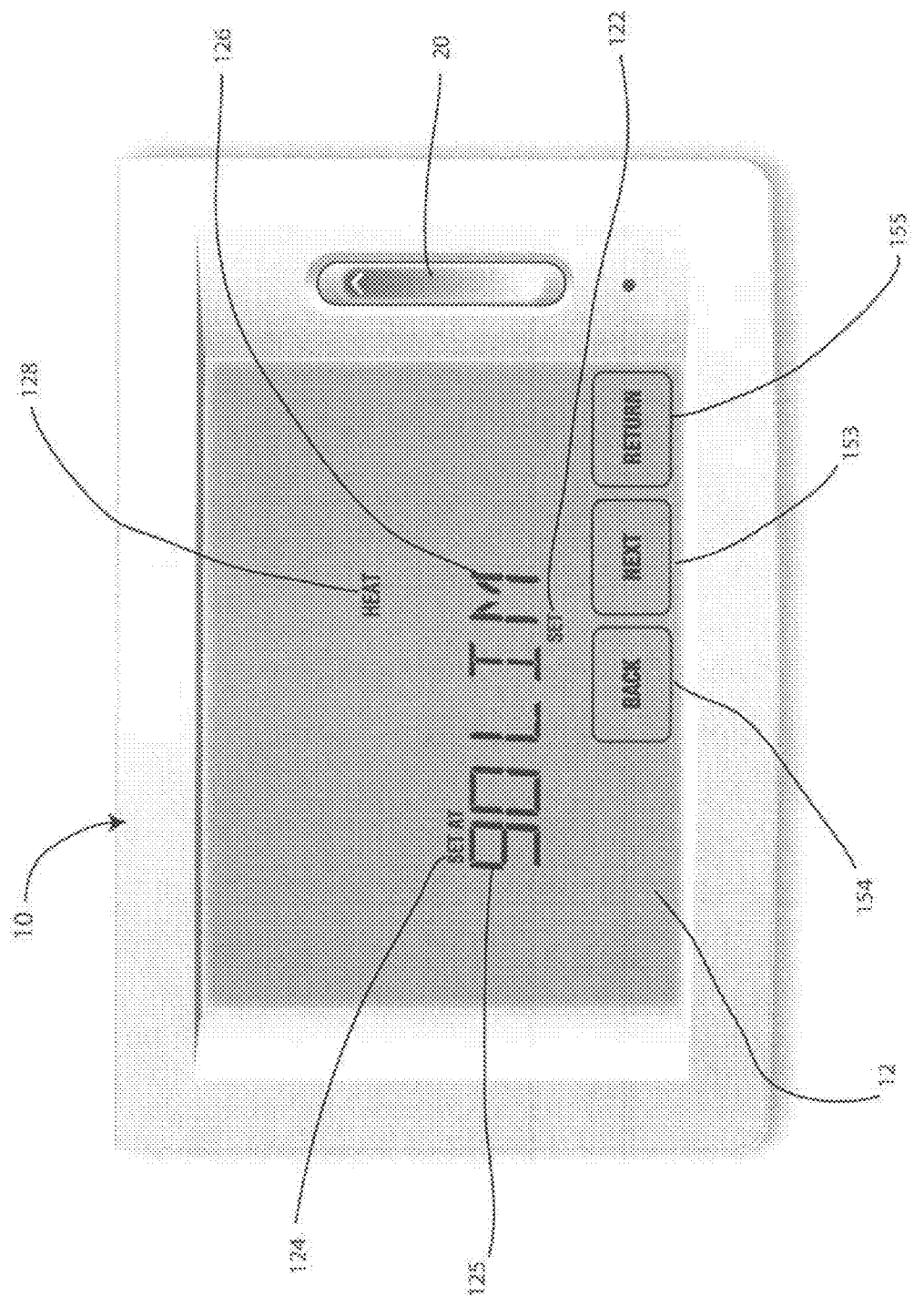

Once the set point lower limit for cooling is set, the user may advance to the next mode selection by activating the "NEXT" button 153 which will reset the display screen 12 (as shown in FIG. 11) for setting the upper limit for the heating mode. The display screen 12 identifies that it is the installer setting for the upper limit for the heating mode. The display screen 12 displays alpha-numeric icon 128 "HEAT" and the alpha-numeric icon 126 "LIM" for the limit. As discussed with respect to the cooling lower limit mode (described with respect to FIG. 10), the display of FIG. 11 also includes the "SET" icon 122, the "SET AT" icon 124 and the numeric icon 125. In an embodiment, the factory default setting for the heat set point upper limit is 90° F. The display is initially displayed with the "90" numeric icon and may be adjusted via the rocker switch 20, as discussed above. Although not depicted, further additional modes of the thermostat may be provided such as a compressor balance point and auxiliary heat balance point, according to the same sequence of operations as discussed for the previous modes.

Figure 12:
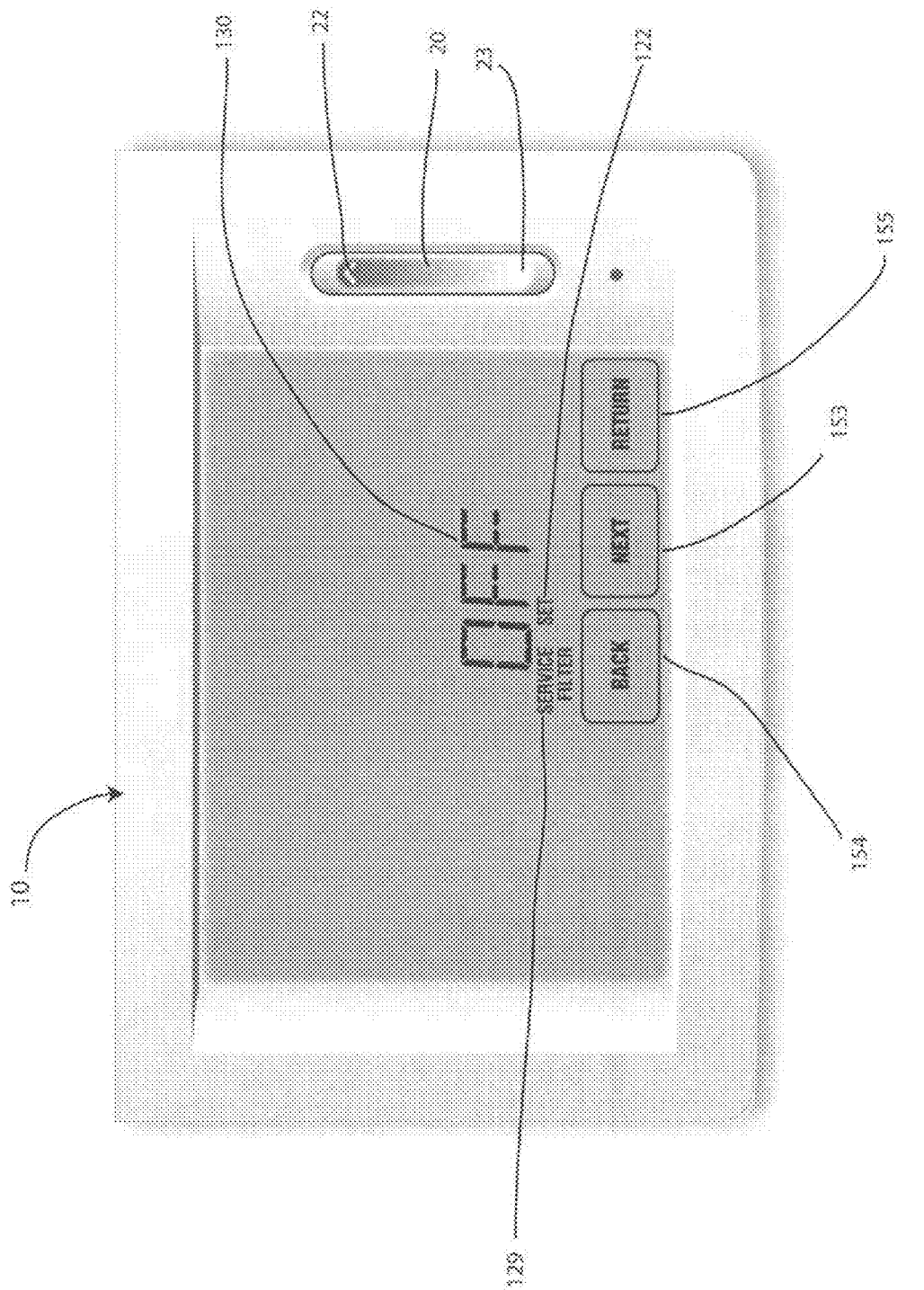

A service filter monitor mode is depicted in FIG. 12 and is identified with respect to icon 129 "SERVICE FILTER". The alpha-numeric icon 130 indicates the option available for the service filter monitor. The default setting in an embodiment is "OFF" indicating that no monitoring of the service filter will be undertaken. Other options may be available such as 30, 60, 90, 120, 180 or 365 days in order to monitor the service Filter. These options may be selected via the rocker switch 20. As discussed previously, by depressing the first end 22 of the rocker switch 20, the alpha-numeric icon 130 will be incremented to scroll through the range of options described above. Selection of lower numbers of days or to return the "OFF" selection the user may depress the second end 23 of the rocker switch 20, to cause decrementation of the alpha-numeric icon 130. Once the setting is completed, the user may activate the "NEXT" button 153 or return to the previous screen by activating "BACK" button 154.

Figure 13:
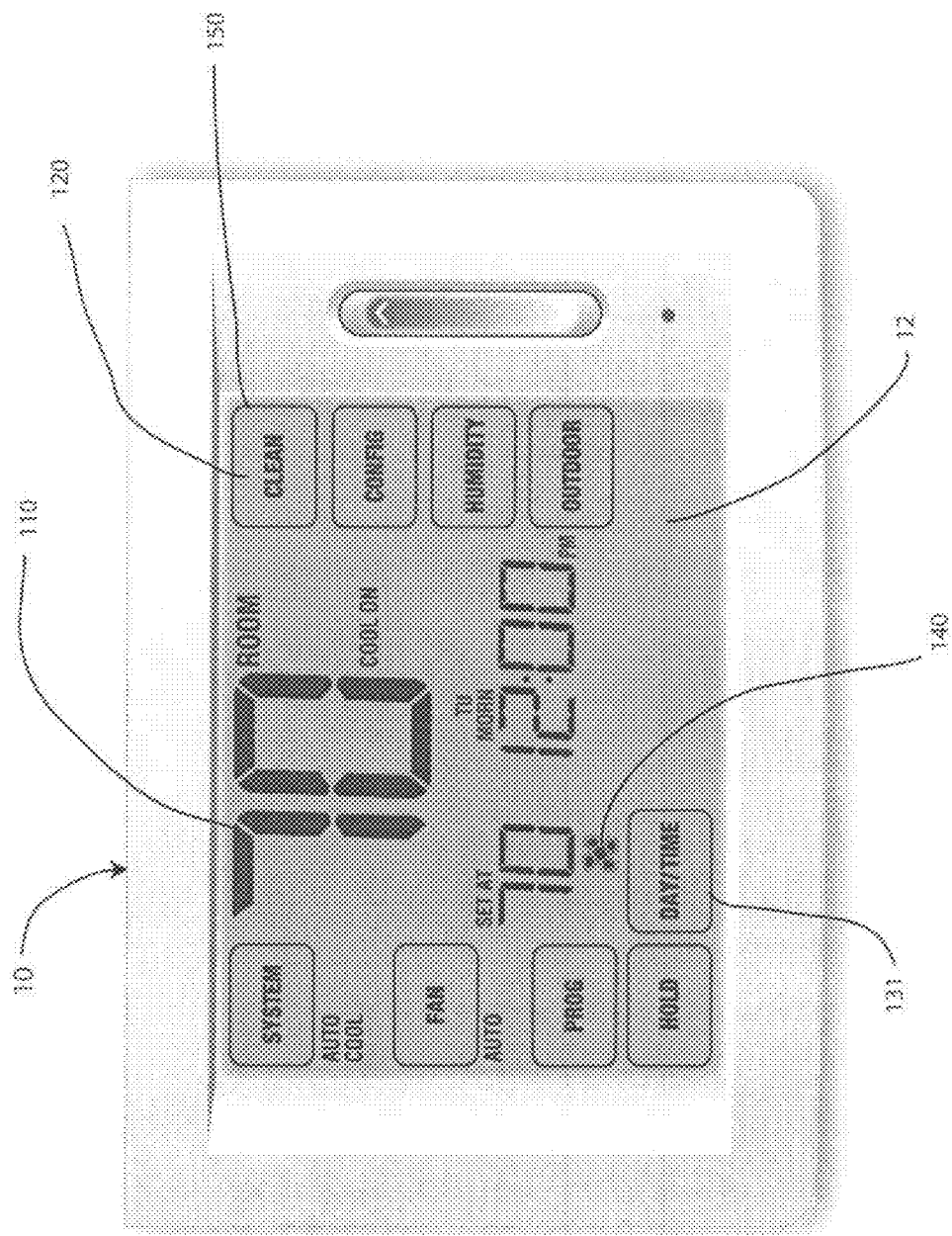
Figure 14:
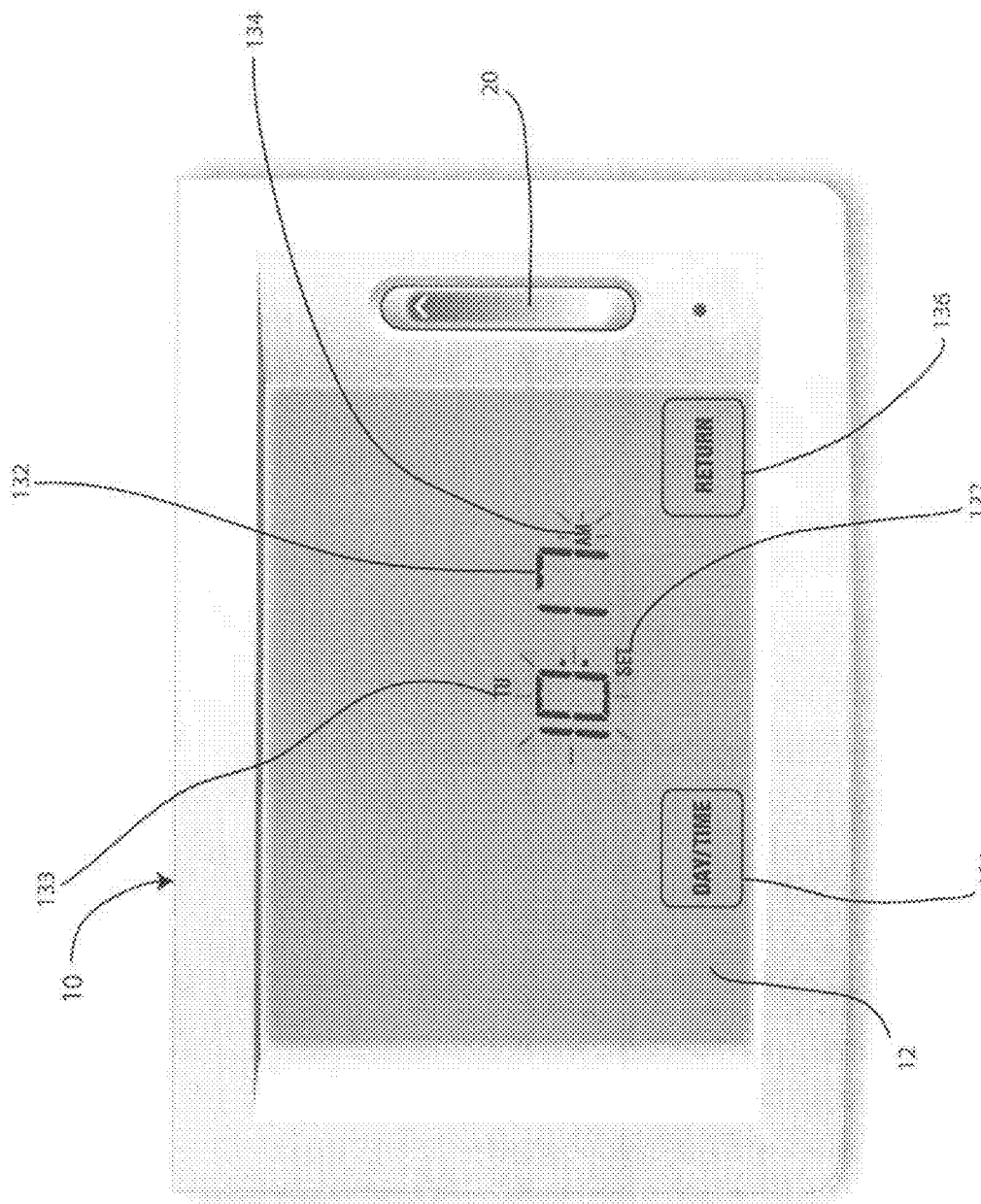

Setting the time, day and temperature user settings will now be discussed with respect to FIGS. 13-18. FIG. 13 depicts an embodiment where the display screen 12 has a standard configuration of touch pad buttons 150a, 150b, alpha-numeric icons 120, numeric icons 110 and graphical icons 140. In order to set the time and day, the user selects the "DAY/TIME" button, touch pad 131. Activation of the "DAY/TIME" button 131 will advance the display to the day/time setting mode as depicted in FIG. 14. The numeric icon 132 appears which represents the time 10 be adjusted ("10:17"). The icon also includes alpha-numeric icon 133 representing the day of the week (e.g. "TU" for Tuesday), alpha-numeric icon 134 representing either "AM" or "PM" and the "SET" icon 122. The first time setting mode is to set the hour of the day, which is indicated in FIG. 14 on the display screen 12 by the numeric "10" flashing and the "AM" alpha-numeric icon 134 flashing. In an alternate embodiment, an icon may be modified to indicate that it is being adjusted (e.g. decrement, increment) by a halo icon surrounding the particular icon that is to be adjusted by the user, or other modifications of the alpha-numeric icon, such as using bold, different font type, or placing other graphics around or adjacent the numeric icon.

Figure 15:
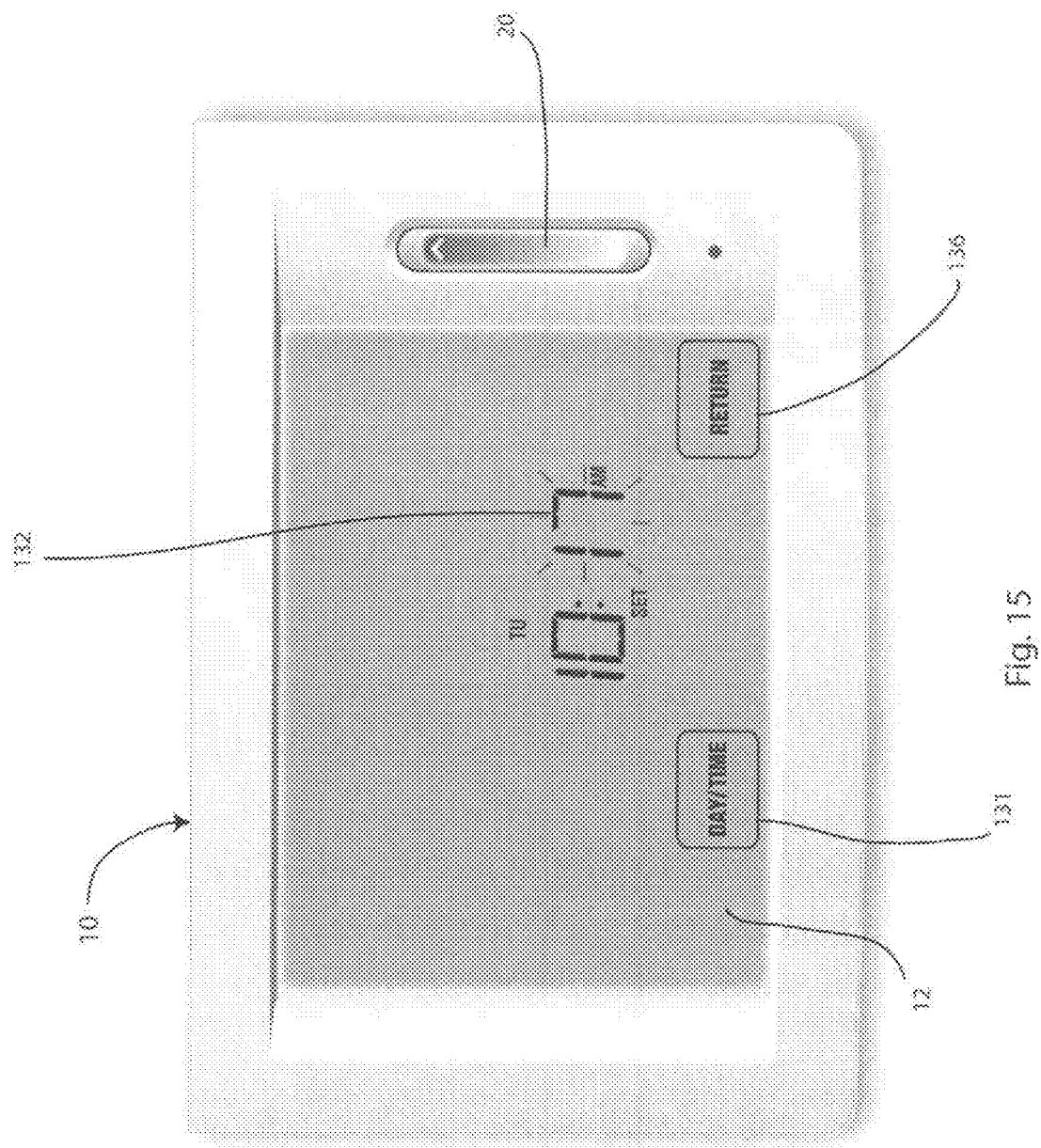

The display screen 12 having the flashing "10" "AM" indicates to the user that she may adjust the hour icon 120 by using the rocker switch 20. As discussed before, the rocker switch 20 may increment or decrement the value in order to change the hour. It is understood that as the hour is incremented or decremented the alpha-numeric icon 134 will change to "PM" when the end of the 12 hour cycle has been reached. Once the desired set point is reached for the hour mode, the user depresses the "DAY/TIME" touch pad 131 in order to advance to the next mode, which is the minute setting mode, as shown in FIG. 15. Should the user want to discontinue the process, she may activate the "RETURN" touch pad 136 to go back to the previous mode display.

Turning to FIG. 15, the minute setting mode is adjustable, which is evident by the flashing of the minutes (i.e. "17"). The set point for the minutes numeric icon 132 may be adjusted by using the rocker switch 20, in order to increment or decrement the numeric value. The user can clearly see that the minutes numeric icon 130 is being adjusted due to the flashing of the minutes value and due to the disappearance of the hour flashing (as shown in FIG. 14). Once the desired minute set point has been set by the user's actuation of the rocker switch 20, the "NEXT" mode may be reached by activating the "DAY/TIME" touch pad 131.

Figure 16:
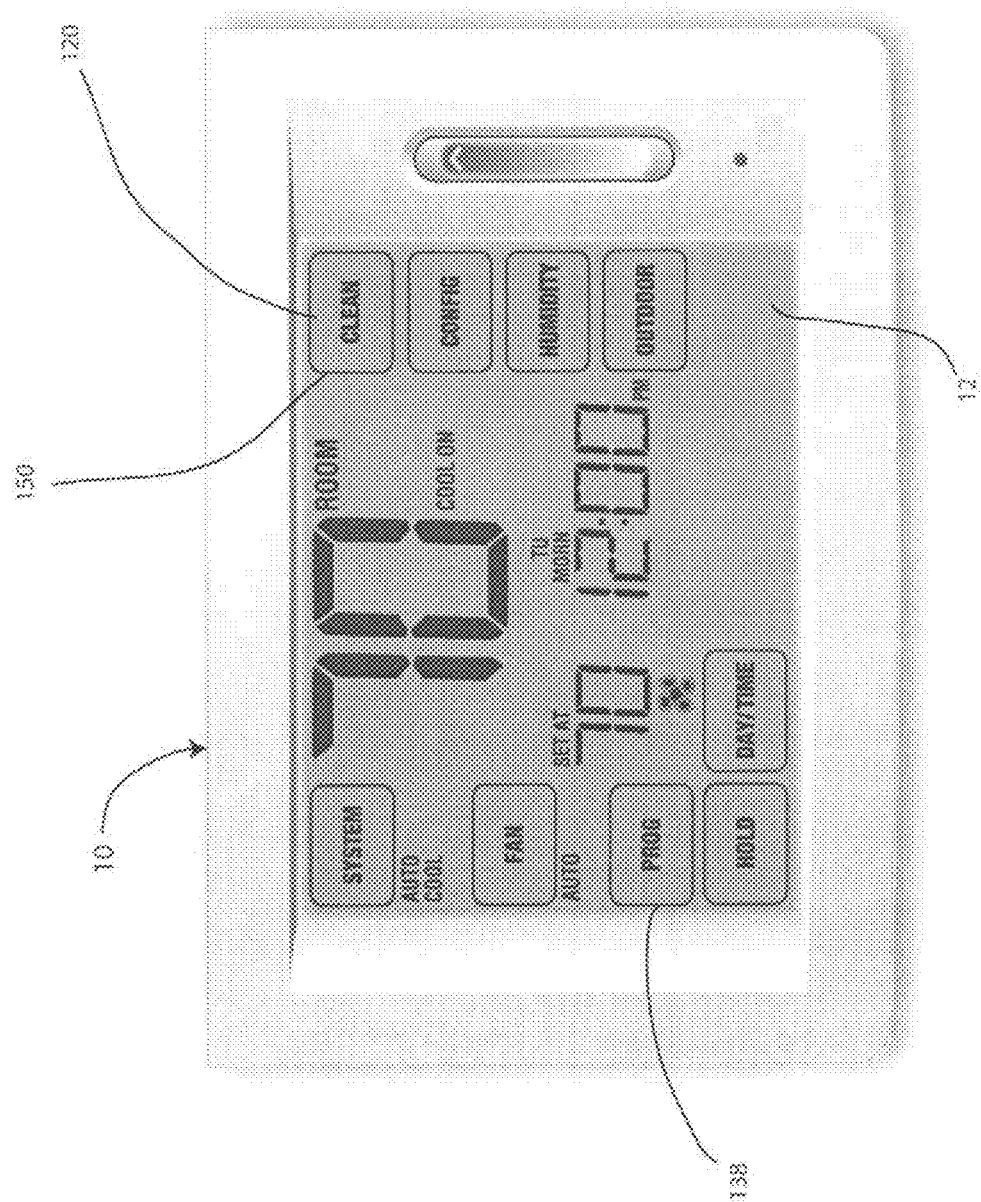
Figure 17:
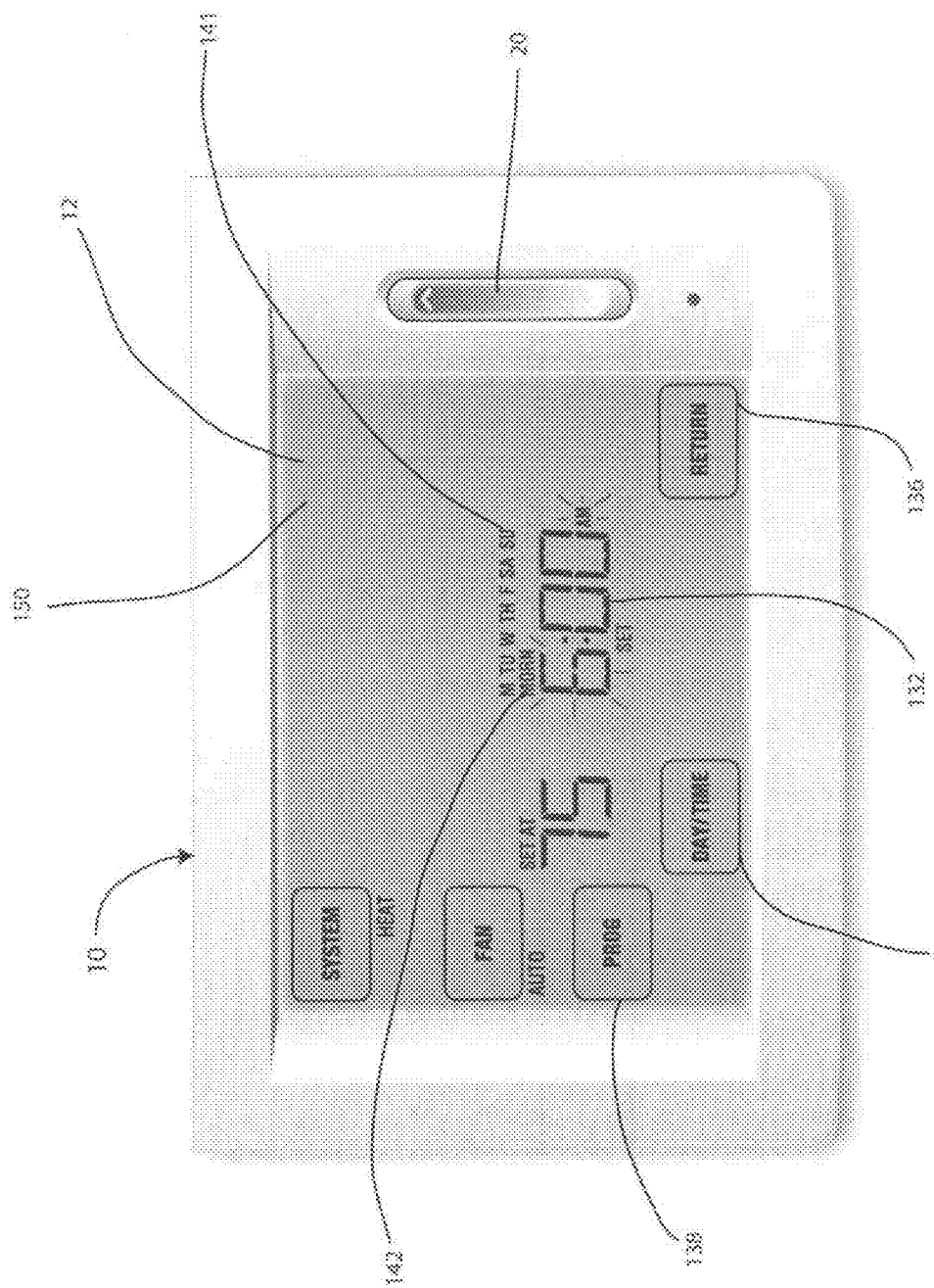

FIG. 16 shows the standard display for an embodiment of the thermostat 10 of the present invention. As the display shown in FIG. 16 indicates, there are numerous modes available for a user to select via the alpha-numeric icons 120. For example, the user may program the thermostat 10 by activating the "PROG" button 138. When programming is selected by depressing the "PROG" button 138, the display screen 12 is reset as shown in FIG. 17. The first programming setting mode provides for input of a schedule for the time and temperature adjustments to be made each day.

Figure 18:
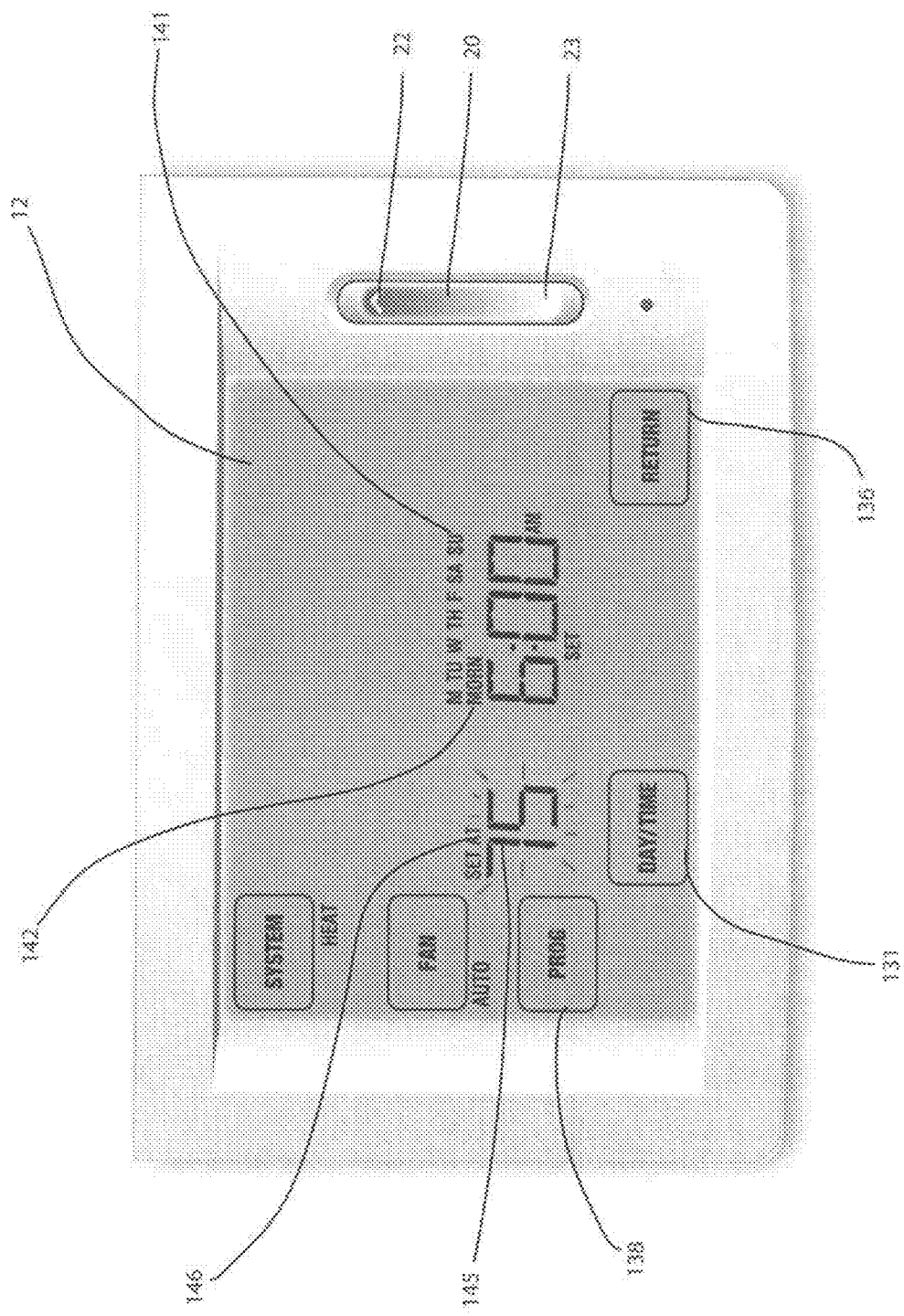

First, the time is set, as discussed before with respect to FIGS. 14-15. However, the programming mode also provides for a day of the week alpha-numeric icon 141 and time period icon 142. The day of the week icon 141 displays each of the seven days of the week and allows for the user to either select a time and temperature that is the same for each of those seven days of the week, or select settings for individual days. The time period icon 142 either morning (i.e. "MORN", DAY, evening ("EVE"), or NIGHT will allow for the setting of the time and temperature during those time periods. In the embodiment depicted in FIG. 17, the time numeric icon 132 has "6" and "AM" flashing. The flashing indicates that the hour set point may be adjusted by the rocker switch 20. As discussed above, advancement to the minute setting mode may be accomplished by depressing the "DAY/TIME" touch pad 131 in order to display the flashing icon as the minute portion numeric icon 132 (i.e. "00"). Once the time set point is finalized by use of the rocker switch 20 incrementing or decrementing the numeric value, the "DAY/TIME" touch pad 131 may be activated in order to adjust the temperature as depicted in FIG. 18.

As a result of the activation of the touch pad 131, the display is reset so the flashing numeric icon 145 representing the temperature in Fahrenheit. The "SET AT" alpha-numeric icon 146 in FIG. 18 indicates that the thermostat 10 is being set at 75 degrees at 6 am and the user may adjust that numeric icon 145 via the rocker switch 20. In this way numeric icon 145 is interdependent with numeric icon 132, since the temperature and time settings are paired together by the microprocessor to control the air handler. Once the desired set point for the temperature is adjusted, using the decrement or increment function of the rocker switch 20 (as will be indicated by the numeric icon 145) the user may complete the setting and save the selected values by depressing the program ("PROG") touch pad 138.

Thus, it may be understood that during at least a first or second mode of operation, such as the selection of the programming the time programming mode; the rocker switch 20 may be depressed to a first position where the first end 23 is depressed in order to actuate the receptor 44 on the printed circuit board 15 (FIG. 2) which will signal the microprocessor 48 to adjust the set point (i.e. numeric) icon 132 for a first mode of operation. Then in a second mode of operation (as selected by activating the "PROGRAM" touch pad 138) the rocker switch 20 may be activated to a first or second position by depressing either the first or second end 22, 23, respectively; such as the temperature icon 145. In this way, it is understood that the single rocker switch 20 may provide for adjustment of set points for multiple modes of operation.

Also, as discussed above, the rocker switch 20 may allow for adjustment for modes of operation as well. Thus, it may be understood that the first mode of operation that may be adjusted by the rocker switch 20 or the touch pad areas 150a, 150b of the display screen 12 may include temperature settings, time of day settings, day of week setting, programming set points for time, installer setting configurations or user settings. Each of these may also be considered second or third modes of operations that may be adjusted either by the rocker switch 20 or by the touch pad areas 150a, 150b buttons on the display screen 12. Some of the particular modes may include programming, configuration, system, fan, holding, day, time, clean, humidity, outdoor, installer or user modes that may adjust either by the rocker switch 20 or the touch pad areas 150a, 150b on the display screen 12 or a combination of both. Other modes of operation include residential, commercial, programming, system type, set point lower limit, set point upper limit, humidity value, compressor balance point, auxiliary heal balance point or service filter monitor modes that be adjusted or selected by the rocker switch 20 or the touch pad areas 150a, 150b of the display screen 12 or a combination of both.

While various concepts have been described in detail, it would be appreciated by those skilled in the art that various modifications and alternatives to those concepts could be developed in light of the overall teachings of the disclosure. Therefore, a person skilled in the art, applying ordinary skill, will be able to practice the invention set forth in the claims without undue experimentation. It will additionally be appreciated that the particular concepts exposed herein are meant to be illustrative only and not limiting to the scope of the invention, which is to be given the full breath of the appended claims and any equivalents thereof.

What is claimed:

1. A thermostat including a microprocessor for controlling an HVAC system using multiple modes of operation, the thermostat comprising:
    a housing having a circuit board and a display screen; the display screen having a first and second alpha-numeric icon;
    a rocker switch mounted in the housing adjacent the display screen, the rocker switch having a bar having a first end and a second end and the bar is pivotally mounted so that the bar may rock between a first position where the first end is depressed and a second position where the second end is depressed, the rocker switch providing the sole mechanical button of the thermostat, the rocker switch for signaling the microprocessor in order to adjust at least the first alphanumeric icon, so that the combination of inputs received by the microprocessor from the group of touch sensitive areas and the sole mechanical button provide for each and every adjustment required for the standard operational functions of the thermostat;
    a first receptor mounted on the circuit board adjacent the first end and a second receptor mounted on the circuit board adjacent the second end;
    the first and second receptors for signaling the microprocessor in order to adjust the first and second alpha-numeric icon on the display screen during at least a first and a second mode of operation of the thermostat;
    during the first mode of operation moving the rocker switch to the first or second position to cause an adjustment of the first alpha-numeric icon in relation to the first mode of operation;
    during the second mode of operation moving the rocker switch to the first or second position in order to adjust the first or second alpha-numeric icon in relation to the second mode of operation; and
    a navigation button for navigating between a first and second function.

2. The thermostat of claim 1 wherein the navigation button comprises one of a BACK button, a NEXT button and a RETURN button.

3. The thermostat of claim 1 wherein the navigation button is a touch sensitive area and comprises one of a BACK button, a NEXT button and a RETURN button that each appear on the display simultaneously.

4. The thermostat of claim 1 wherein the first function comprises one of a mode for adjusting the temperature setting, time of day setting, day of week setting, programming set point time, installer setting configuration or user setting and the second function one of a mode of adjusting the temperature setting, time of day setting, day of week setting, programming set point time, installer setting configuration or user setting.

5. The thermostat of claim 1, wherein the first and second function are a mode of operation.

6. The thermostat of claim 5, wherein the first and second mode of operation are a display that is adjusted when the navigation button is activated.

7. The thermostat of claim 1, wherein the display screen includes the at least one alpha-numeric icon for the navigation button that provides for navigation to one of a programming, configuration, system, fan, hold, day, time, clean, humidity, outdoor, installer or user modes.

8. The thermostat of claim 1, wherein the rocker switch adjusts one of a time, day, temperature, fan or humidity value after selection of the mode via the navigation button.

9. The thermostat of claim 1, wherein the navigation button selects the second mode of operation.

10. The thermostat of claim 1, wherein the navigation button function is operated by the rocker switch.

11. The thermostat of claim 1, wherein the first position increments a set point of the first mode of operation after selection of the mode via the navigation button.

12. The thermostat of claim 1, wherein the second position decrements a set point of the first mode of operation after selection of the mode via the navigation button.

13. The thermostat of claim 1, wherein the navigation button has a constant function.

14. The thermostat of claim 1, wherein the display screen includes a touch sensitive area separate from the navigation button for selecting the first mode of operation and the second mode of operation and the rocker switch for adjusting set points for the modes selected by the touch sensitive area.

15. The thermostat of claim 1, wherein the rocker switch is depressed to adjust a set point to a first value for the first mode of operation, a first icon on the display is adjusted to reflect the first value; and the navigation button being activated to select the second mode of operation, wherein the rocker switch is depressed to adjust a set point to a second value for the second mode of operation and a second icon on the display is adjusted to reflect the second value.

16. The thermostat of claim 1, wherein multiple icons are displayed on the display screen simultaneously, and upon activation of the navigation button, the first icon is modified to indicate it is the icon being adjusted, while the other icons remain unchanged.

17. The thermostat of claim 1, wherein the display screen is one of an LCD segmented screen, dot matrix or LED screen.

18. The thermostat of claim 1 wherein the display screen has no touch sensitive areas and the housing includes more than two mechanical buttons for operating the thermostat.

19. The thermostat of claim 1, wherein the navigation button provides a return function to return to the previously selected mode display.

20. A controller for an HVAC system comprising:

a housing having a circuit hoard and a display screen, the display screen having at least one alpha-numeric icon and a group of touch sensitive areas comprising at least two displayable touch sensitive areas including a navigation button;

a microprocessor for controlling the display screen;

a sole mechanical button mounted in the housing and the button having a first end and second end and a touch surface extending between the first end and second end; and the sole mechanical button for signaling the microprocessor in order to adjust the alpha-numeric icon, so that the combination of inputs received by the microprocessor from the group of touch sensitive areas and sole mechanical button provide for each and every adjustment required for all of the standard operational functions of the controller.

21. The controller of claim 20, wherein the navigation button is a single use, constant function button.

22. The controller of claim 21, wherein the navigation button comprises one of a BACK button, a NEXT button and a RETURN button.

* * * * *